United States Patent
Wu

(10) Patent No.: US 9,131,427 B2
(45) Date of Patent: Sep. 8, 2015

(54) CLOSED SUBSCRIBER GROUP INFORMATION PROCESSING METHOD, ACCESS CONTROL METHOD, SYSTEM, AND DEVICE

(75) Inventor: Wenfu Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 526 days.

(21) Appl. No.: 13/009,497

(22) Filed: Jan. 19, 2011

(65) Prior Publication Data

US 2011/0116477 A1    May 19, 2011

Related U.S. Application Data

(63) Continuation of application No. PCT/CN2009/073128, filed on Aug. 6, 2009.

(30) Foreign Application Priority Data

Aug. 7, 2008  (CN) .......................... 2008 1 0134974

(51) Int. Cl.
| | |
|---|---|
| H04W 4/00 | (2009.01) |
| H04W 48/04 | (2009.01) |
| H04L 29/06 | (2006.01) |
| H04W 12/08 | (2009.01) |

(52) U.S. Cl.
CPC .............. *H04W 48/04* (2013.01); *H04L 63/104* (2013.01); *H04W 12/08* (2013.01)

(58) Field of Classification Search
USPC ........................................................ 370/331
See application file for complete search history.

(56) References Cited

U.S. PATENT DOCUMENTS

| | | |
|---|---|---|
| 2004/0205127 A1 | 10/2004 | Ben-Yoseph |
| 2007/0037597 A1 | 2/2007 | Biswas et al. |

(Continued)

FOREIGN PATENT DOCUMENTS

| | | |
|---|---|---|
| CN | 101296451 A | 10/2008 |
| CN | 101390430 A | 3/2009 |
| CN | 101547406 A | 9/2009 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) Access (Release8). Global System for Mobile Communications. Jun. 2008.

(Continued)

*Primary Examiner* — Sulaiman Nooristany
(74) *Attorney, Agent, or Firm* — Brinks Gilson & Lione

(57) ABSTRACT

A Closed Subscriber Group (CSG) information processing method, an access control method, and the corresponding system and devices are disclosed herein. The CSG information processing method includes: obtaining modified CSG information of User Equipment (UE); and sending a message that carries the CSG information to the UE. The method and the corresponding system and devices enable the UE to know the change of the stored CSG information. The access control method includes: obtaining modified CSG information; and detaching a UE from an accessed CSG area when discovering that the UE is not allowed to access the accessed CSG area any longer according to the modified CSG information. The access control method and the corresponding system and devices implement access control under a CSG mechanism.

10 Claims, 13 Drawing Sheets

(56) References Cited

U.S. PATENT DOCUMENTS

| | | | |
|---|---|---|---|
| 2009/0092097 A1* | 4/2009 | Nylander et al. | 370/331 |
| 2009/0196168 A1* | 8/2009 | Aydin et al. | 370/216 |
| 2009/0305699 A1* | 12/2009 | Deshpande et al. | 455/434 |
| 2010/0075670 A1* | 3/2010 | Wu | 455/434 |
| 2010/0165867 A1* | 7/2010 | Nylander et al. | 370/252 |

OTHER PUBLICATIONS

Office Action issued in corresponding Chinese Patent Application No. 200810134974.3; issued Nov. 10, 2011.
International Search Report issued in corresponding PCT Application No. PCT/CN2009/073128; mailed Nov. 19, 2009.
Written Opinion of the International Searching Authority issued in corresponding PCT Patent Application No. PCT/CN2009/073128, mailed Nov. 19, 2009.
Extended European Search Report issued in corresponding European Patent Application No. 09804507.3, mailed Sep. 16, 2011.
3$^{rd}$ Generation Partnership Project, "Technical Specification Group Core Network and Terminals; Non-Access Stratum (NAS) Protocol for Evolved Packet System (EPS)" Stage 3, Release 8. 3GPP TS 24.301, V0.4.0, Jul. 2008.
Global System for Mobile Communications, "3$^{rd}$ Generation Partnership Project, Technical Specification Group Core Network and Terminals; 3GPP System Architecture Evolution; CT WG1 Aspects" Release 8. 3GPP TR 24.801, V1.1.1, Jul. 2008.
3$^{rd}$ Generation Partnership Project, "Technical Specification Group Core Network and Terminals; 3GPP Evolved Packet System; CT WG4 Aspects" Stage 3, Release 8. 3GPP TR 29.803, V0.9.0, Jun. 2008.
Qualcomm Europe, "Pseudo-CR on Impact of CSG Access Control on NAS Procedures" 9.2.2, 3GPP TSG CT WG1 Meeting #54. Zagreb, Croatia, Jun. 23-27, 2008. C1-082353.

* cited by examiner

US 9,131,427 B2

CLOSED SUBSCRIBER GROUP INFORMATION PROCESSING METHOD, ACCESS CONTROL METHOD, SYSTEM, AND DEVICE

CROSS-REFERENCE TO RELATED APPLICATIONS

This application is a continuation of International Application No. PCT/CN2009/073128, filed on Aug. 6, 2009, which claims priority to Chinese Patent Application No. 200810134974.3, filed on Aug. 7, 2008, both of which are hereby incorporated by reference in their entireties.

FIELD OF THE APPLICATION

The present application relates to telecommunications technologies, and in particular, to a Closed Subscriber Group (CSG) information processing method, an access control method, systems, and devices.

BACKGROUND

Currently, the 3rd Generation Partnership Project (3GPP) standardization organization and non-3GPP standardization organizations are developing a new access mode which is known as Home Access (HA). User Equipment (UE) uses authorized spectrum and a generic Internet Protocol (IP) access network such as Digital Subscriber Line (DSL) and Cable Broadband (CB) to get connected to the mobile network of the operator through a home Wireless Access Point (WAP).

A CSG mechanism is introduced in order to restrict the UE from accessing a specific home WAP or a specific WAP. The CSG identifies UEs (or users) authorized to access one or more cells of a operator, but restricts other UEs from accessing such cells. A CSG area includes one or more cells, which are identified by a CSG identifier (ID). A CSG area is accessible to a group of UEs, but not accessible to other UEs than this group. The CSG IDs of all CSG areas accessible to a UE form an allowed CSG list, which is also known as a CSG white list. The allowed CSG list is stored in the UE, and is obtained after the UE gets registered onto the network.

In the process of practicing the prior art, the inventor of the present application finds that after the UE gets registered onto the network, the CSG information (such as allowed CSG list) of the UE may change but the UE is unaware of the change, which makes the user unable to access the allowed CSG area correctly.

Meanwhile, after the CSG information of the UE changes, the accessed CSG area by the UE is no longer accessible to the UE. The prior art provides no solution to detaching the UE from the accessed CSG area.

SUMMARY

One aspect of the present application is to provide a method, a system and a device for processing CSG information so that the UE is notified upon change of the CSG information and the UE can access the allowed CSG area correctly.

Another aspect of the present application is to provide a method, a system and a device for access control to implement access control under a CSG mechanism.

A CSG information processing method includes:
obtaining modified CSG information of UE; and
sending a message that carries the CSG information to the UE.

Another CSG information processing method includes:
by an application server, obtaining CSG information of UE; and
sending a message that carries the CSG information of the UE to the UE.

An access control method includes:
obtaining modified CSG information; and
detaching a UE from an accessed CSG area when discovering that the UE is not allowed to access the accessed CSG area any longer according to the modified CSG information.

A Network Element (NE) device includes:
an information obtaining unit, adapted to obtain modified CSG information; and
a message sending unit, adapted to send a message to UE according to the modified CSG information, where the message carries the CSG information.

Another NE device includes:
an information obtaining unit, adapted to obtain modified CSG information; and
a detaching unit, adapted to detach a UE from an accessed CSG area when discovering that the UE is not allowed to access the accessed CSG area any longer according to the modified CSG information.

A UE includes:
a message receiving unit, adapted to receive a message that carries CSG information, where the CSG information is a "CSG Access Restricted" indication or a "CSG Access Restricted LU Required" indication; and
a CSG deleting unit, adapted to delete an CSG ID of an accessed CSG from an allowed CSG list according to the "CSG Access Restricted" indication or the "CSG Access Restricted LU Required" indication.

Another UE includes:
a message receiving unit, adapted to receive a message that carries CSG information which is modified CSG information; and
a CSG updating unit, adapted to update a stored allowed CSG list according to the modified CSG information.

An NE device includes:
an information obtaining unit, adapted to obtain CSG information; and
a message sending unit, adapted to send a message to UE through an application server, where the message carries the CSG information of the UE.

A network system includes: a mobility management network element or non-3GPP Access Gateway (AGW), and a UE.

The mobility management network element or non-3GPP AGW is adapted to obtain modified CSG information, and send a message to the UE according to the modified CSG information, where the message carries the CSG information; and The UE is adapted to receive the message that carries the CSG information.

A network system includes:
an application server, adapted to obtain CSG information of UE, and send a message that carries the CSG information of the UE to the UE; and
a UE, adapted to receive the message that carries the CSG information.

In the foregoing technical solution, the modified CSG information is obtained, and a message that carries the CSG information is sent to the UE according to the modified CSG information. In this way, the UE can know that the stored CSG information has changed, and can access the allowed CSG area correctly.

Meanwhile, after discovering that the UE is not allowed to access the accessed CSG area any longer according to the modified CSG information, the mobility management network element or non-3GPP gateway detaches the UE from the accessed CSG area, thus accomplishing access control under a CSG mechanism.

DETAILED DESCRIPTION OF THE EMBODIMENTS

The embodiments provide a CSG information processing method so that the UE is notified upon change of the CSG information and the UE can access the allowed CSG area correctly. The corresponding systems and network devices are also provided, as detailed below.

Figure 1:
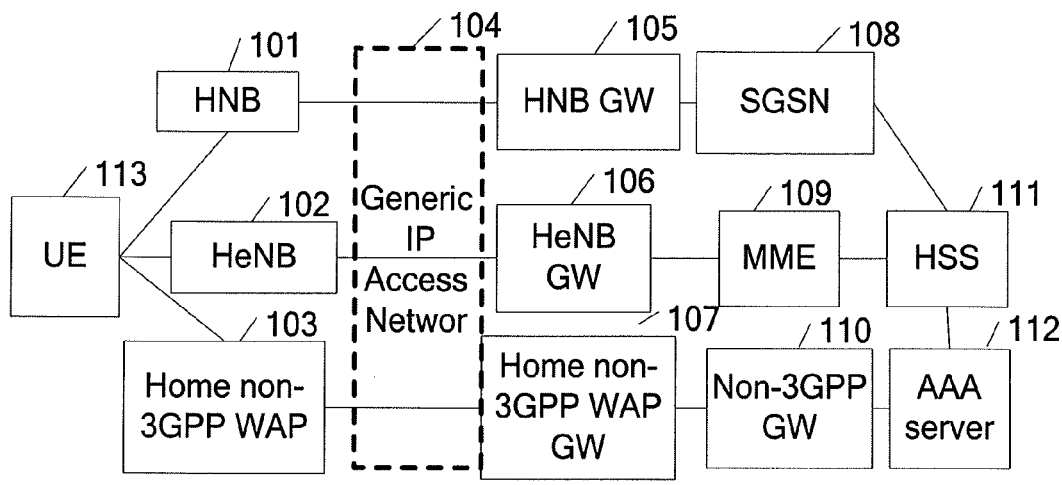
FIG. 1 shows architecture of a home access system according to an embodiment of the present application.

In order to help those skilled in the art better understand and implement the embodiments, the following gives a brief introduction to a home access system in an embodiment. FIG. 1 shows architecture of a home access system in an embodiment. The system includes a home WAP, which uses an authorized spectrum to connect the UE 113 with the mobile network of the operator through a generic IP access network. A home WAP is also known as a Femtocell. Home WAPs include: a Home NodeB (HNB) 101 that runs on a UMTS Terrestrial Radio Access Network (UTRAN) spectrum, a Home evolved NodeB (HeNB) 102 that runs on an Evolved UTRAN (E-UTRAN) spectrum, and a home non-3GPP WAP 103 that runs on a non-3GPP network spectrum. The generic IP access network 104 enables IP connection for the UE. Through the generic IP access network, the UE gets connected to the mobile network of the operator by using a home WAP and the authorized spectrum. A home WAP gateway (GW) is capable of performing management and access control for home WAPs, aggregating the home WAPs, and routing and forwarding signaling data between the home WAP and the NE in the mobile network. Home WAP GWs include: a HNB GW 105 that runs on a UTRAN, a HeNB GW 106 that runs on an E-UTRAN, or, a home non-3GPP WAP GW 107 that runs on a non-3GPP access network. A Mobility Management Entity (MME) 109 is responsible for control-plane mobility management in an E-UTRAN network, for example, user context and mobility state management, and allocation of temporary identifiers of users. A Serving GPRS Supporting Node (SGSN) 108 is responsible for routing and forwarding in a GPRS/UMTS network, mobility management, session management, and storage of user information. A non-3GPP GW 110 implements mobility management and session management in a non-3GPP network. A Home Subscriber Server (HSS) 111 is adapted to store subscription information of a subscriber. An Authentication Authorization and Accounting (AAA) server 112 is adapted to perform access authentication, authorization, and accounting for the UE 113.

It should be noted that the system architecture shown in FIG. 1 is not necessarily an ultimate home access system architecture. The ultimate architecture may vary, which shall not be construed as limitation on the claims.

Figure 2:
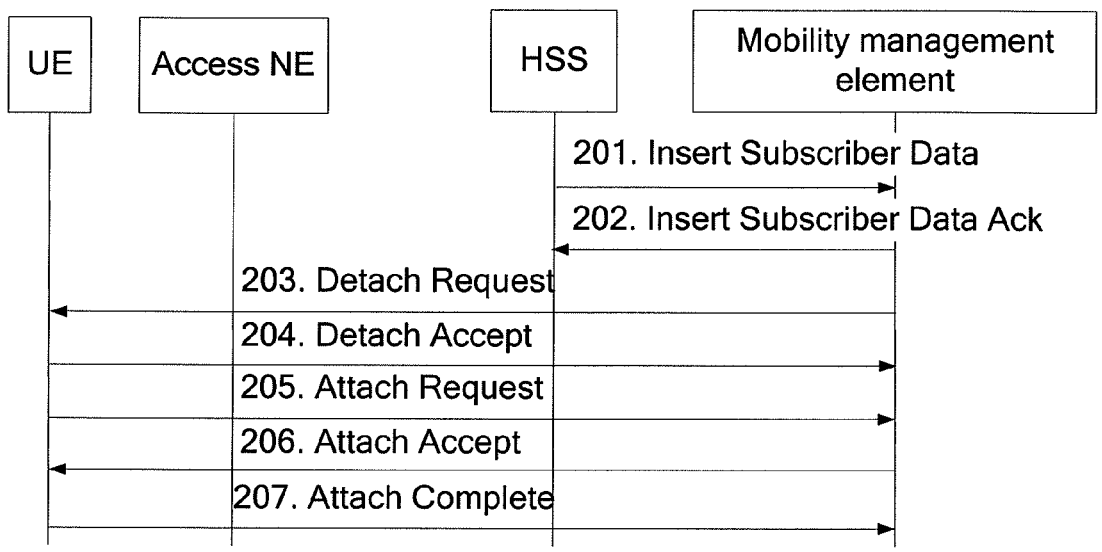
FIG. 2 is a signaling flowchart of a CSG information processing method according to the first embodiment.

In this embodiment, the modified CSG information is obtained, and a message that carries the CSG information is sent to the UE according to the modified CSG information. In this way, the UE can know that the stored CSG information has changed. The CSG information varies with the application scenario. For example, the CSG information may be a "CSG Access Restricted" indication, or a "CSG Access Restricted LU Required" indication, or a location update indication, or modified CSG information. The following gives more details through preferred embodiments:

FIG. 2 is a signaling flowchart of a CSG information processing method in the first embodiment. The CSG information of the UE changes, and the UE is not allowed to access the accessed CSG any longer. The mobility management network element sends a Detach Request message to the UE. The cause value in the Detach Request message is set to "CSG Access Restricted", indicating that the UE is restricted from accessing the accessed CSG; or the Detach Request message carries modified CSG information. The detailed process is as follows:

201. The CSG information (such as allowed CSG list) of the UE changes, and the HSS sends an Insert Subscriber Data message to the mobility management network element. The message carries the CSG information of the UE.

Alternatively, the background system (such as Operation Support System (OSS) or Business Operation Support System (BOSS)) of the operator notifies the CSG information of the UE to the mobility management network element. For example, the background system of the operator sends a CSG Notify message to the mobility management network element, with the message carrying the CSG information of the UE.

For a GERAN/UTRAN network, the mobility management network element is SGSN; for an E-UTRAN network, the mobility management network element is MME.

202. The mobility management network element returns an Insert Subscriber Data Acknowledge (Ack) message to the HSS.

If the mobility management network element receives a CSG Notify message sent by the background system of the operator, the mobility management network element may return a CSG Notify Ack message to the background system of the operator.

203. If the CSG information of the UE changes, which makes the UE unable to access the accessed CSG any longer, the mobility management network element sends a Detach Request message to the UE.

The cause value in the Detach Request message is set to "CSG Access Restricted", or the Detach Request message carries CSG information (such as allowed CSG list) of the UE.

204. The UE accepts the Detach Request from the mobility management network element, and returns a Detach Accept message to the mobility management network element.

If the Detach Request message in step 203 carries a "CSG Access Restricted" indication, the UE deletes the CSG ID of the accessed CSG from the allowed CSG list.

If the Detach Request message in step 203 carries CSG information of the UE, the UE updates its allowed CSG list according to the received CSG information.

205. The UE selects a non-CSG cell or another cell under the CSG, and sends an Attach Request message to the mobility management network element.

The non-CSG cell may be a cell of a macro network.

The UE selecting a non-CSG cell or another cell under the CSG refers to selecting a target cell.

206. The mobility management network element returns an Attach Accept message to the UE, with the message carrying the CSG information of the UE.

207. After receiving the Attach Accept message, the UE returns an Attach Complete message to the mobility management network element, and updates its allowed CSG list according to the received CSG information.

Evidently, in this embodiment, after discovering that the UE is not allowed to access the accessed CSG area any longer, the mobility management network element detaches the UE from the accessed CSG area through a detaching procedure, thus accomplishing access control under a CSG mechanism.

In this embodiment, through a Detach Request message, the UE knows that the CSG information changes, and updates its allowed CSG list according to the CSG information carried in the Detach Request message directly, or deletes the CSG ID of the accessed CSG from the allowed CSG list to update the allowed CSG list. In this way, the UE will not select the access NE corresponding to the deleted CSG ID for accessing any more, thus avoiding invalid access and improving the user experience.

Moreover, in this embodiment, when the accessed CSG area is not accessible, the UE selects a non-CSG cell or another CSG cell, and obtains the modified CSG information through an attaching procedure, thus knowing the accessible CSG accurately. Subsequently, the UE may select only the access NE corresponding to the accessible CSG ID for accessing, thus avoiding invalid access and improving the user experience.

Figure 3:
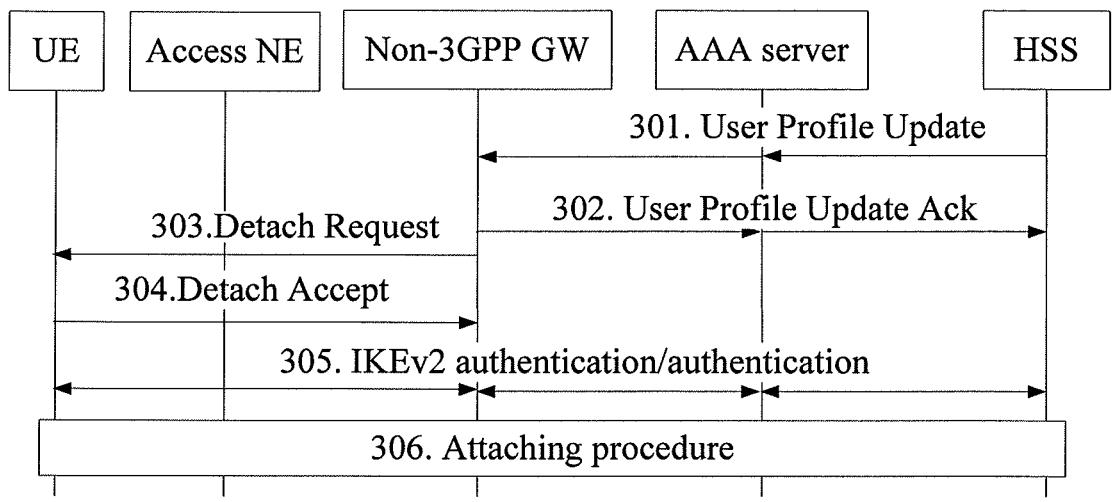
FIG. 3 is a signaling flowchart of a CSG information processing method according to the second embodiment.

FIG. 3 is a signaling flowchart of a CSG information processing method in the second embodiment. Unlike the previous embodiment, this embodiment is applied to a non-3GPP network. When the CSG information of the UE changes and the UE is not allowed to access the accessed CSG any more, the non-3GPP GW sends a Detach Request message to the UE. The following gives the detailed steps:

301. The CSG information of the UE changes, and the HSS or the background system of the operator notifies the CSG information of the UE to the non-3GPP GW.

For example, the HSS sends a User Profile Update message to the AAA server, with the message carrying the CSG information of the UE; and the AAA server sends the User Profile Update message to the non-3GPP GW, with the message carrying the CSG information of the UE. Alternatively, the background system of the operator sends a CSG Notify message to the AAA server, with the message carrying the CSG information of the UE; and the AAA server sends a User Profile Update message to the non-3GPP GW, with the message carrying the CSG information of the UE.

For a Wireless Local Area Network (WLAN), the non-3GPP GW is an Evolved Packet Data Gateway (EPDG); for a Worldwide Interoperability for Microwave Access (WiMax) network, the non-3GPP GW is an Access Service Network (ASN) GW; for a Code Division Multiple Access (CDMA) network, the non-3GPP GW is an AGW; for a High Rate Packet Data (HRPD) network, the non-3GPP GW is an HRPD Serving Gateway (HSGW).

302. The non-3GPP GW returns a Profile Update Ack message to the AAA server. The AAA server returns a User Profile Update Ack message to the HSS or returns a CSG Notify Ack message to the background system of the operator.

303. If the CSG information of the UE changes, and the UE is not allowed to access the accessed CSG any longer, the non-3GPP GW sends a Detach Request message to the UE.

The cause value in the Detach Request message is set to "CSG Access Restricted", or the Detach Request message carries CSG information of the UE.

304. The UE accepts the Detach Request from the non-3GPP GW, and returns a Detach Accept message to the non-3GPP GW.

If the cause value in the Detach Request message in step 303 is set to "CSG Access Restricted", the UE deletes the accessed CSG from the allowed CSG list; if the Detach Request message in step 303 carries the CSG information of the UE, the UE updates its allowed CSG list according to the received CSG information.

305. The UE selects a non-CSG cell or another cell under the CSG, and then triggers an attaching procedure.

The non-CSG cell may be a cell in a macro network.

An Internet Key Exchange Protocol Version 2 (IKEv2) authentication procedure or an authentication procedure is implemented between the UE, the non-3GPP GW, the AAA server, and the HSS. In such two procedures, the non-3GPP GW notifies the CSG information of the UE to the UE, and the UE updates its allowed CSG list according to the CSG information of the UE.

306. The UE initiates an attaching procedure, and implements the attaching procedure specific to the non-3GPP network.

Figure 4:
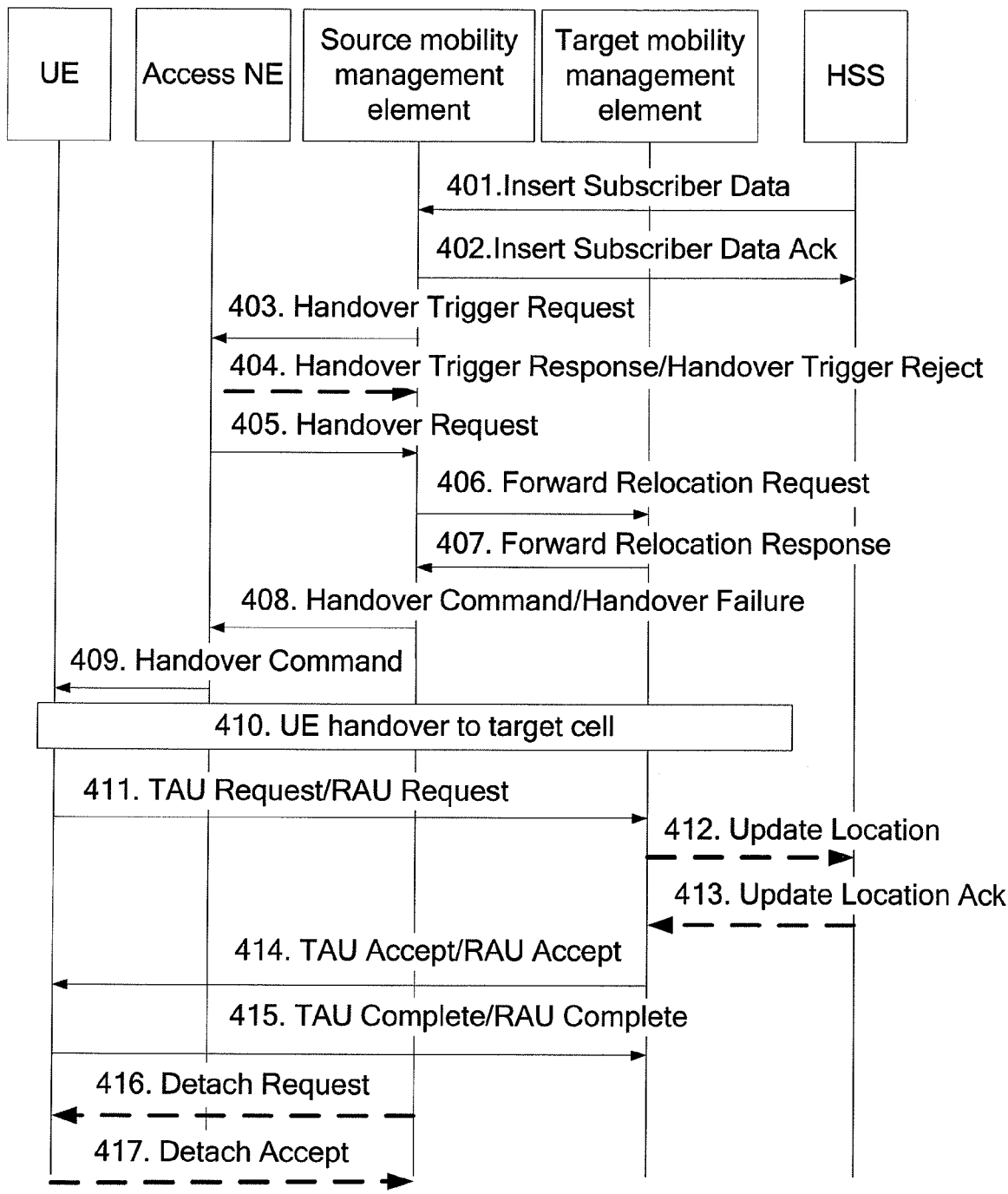
FIG. 4 is a signaling flowchart of a CSG information processing method according to the third embodiment.

FIG. 4 is a signaling flowchart of a CSG information processing method in the third embodiment. When the CSG information of the UE changes and the UE is not allowed to access the accessed CSG, the mobility management network element sends a message to the access NE, requesting the access NE to hand over the UE to the macrocell or to another CSG cell, namely, a cell corresponding to another CSG ID in the allowed CSG list. The mobility management network element may instruct the UE to trigger a location update procedure in the handover procedure, and the UE triggers the location update procedure according to the notification. In the location update procedure, the mobility management network element notifies the CSG information of the UE to the UE, and the UE updates the stored allowed CSG list according to this CSG information. Alternatively, the mobility management network element notifies the CSG information of the UE to the UE in the handover procedure, and the UE updates the stored allowed CSG list according to the CSG information. The detailed steps are as follows:

401. The CSG information of the UE changes, and the HSS sends an Insert Subscriber Data message to the mobility management network element. The message carries the subscriber CSG information of the UE.

Alternatively, the background system (such as OSS or BOSS) of the operator notifies the CSG information of the UE to the mobility management network element. For example, the background system of the operator sends a CSG Notify message to the mobility management network element, with the message carrying the CSG information of the UE.

For a GERAN/UTRAN network, the mobility management network element is SGSN; for an E-UTRAN network, the mobility management network element is MME.

402. The mobility management network element returns an Insert Subscriber Data Ack message to the HSS.

If the mobility management network element obtains the CSG information from the background system of the operator, the mobility management network element returns a CSG Notify Ack message to the background system of the operator.

403. When the CSG information of the UE changes and the UE is not allowed to access the accessed CSG, the mobility management network element sends a Handover Trigger Request message to the access NE, requesting the access NE to hand over the UE to a cell of the macro network or to a CSG cell corresponding to another CSG ID in the allowed CSG list of the UE.

Optionally, the Handover Trigger Request message carries the CSG information of the UE.

The access NE may be an HNB (if the mobile network is a GERAN/UTRAN network), or an HeNB (if the mobile network is an E-UTRAN), or an access point such as NodeB capable of CSG functions (namely, the access point is accessible to a group of specified UEs only), or an evolved access point (eNodeB) capable of CSG functions.

Optionally, in step 403, the mobility management network element starts a timer, which is known as a detaching timer.

404. Optionally, if the access NE finds that no proper target cell is available for handover, the access NE sends a Handover Trigger Reject message to the mobility management network element, indicating that the access NE is unable to trigger the handover procedure; if the access NE finds a proper target cell for handover, the access NE sends a Handover Trigger Response message to the mobility management network element, indicating that the access NE can trigger a handover procedure, and the procedure proceeds to steps 405-415.

In step 404, if the mobility management network element receives a Handover Trigger Response message or a Handover Trigger Failure message sent by the access NE, the mobility management network element stops the detaching timer.

405. The access NE selects a target cell, and sends a Handover Required message to the source mobility management network element, requesting to hand over to the target cell.

The source mobility management network element is the mobility management network element accessed by the UE.

406. The source mobility management network element sends a Forward Relocation Request message to the target mobility management network element.

The target mobility management network element is the mobility management network element to which the UE will be handed over.

407. The target mobility management network element handles the Forward Relocation Request message, and returns a Forward Relocation Response message to the source mobility management network element. The response message carries a cause value indicating success or failure of the handover request.

If the source mobility management network element is the same as the target mobility management network element, the interaction in step 406 and step 407 is interaction within the same NE.

408. If the target mobility management network element in step 407 notifies handover request success to the source mobility management network element, the source mobility management network element sends a Handover Command message to the access NE. If the target mobility management network element in step 407 notifies handover request failure to the source mobility management network element, the source mobility management network element sends a Handover Failure message to the access NE.

Optionally, the Handover Command message carries location area update indication information, instructing the UE to initiate a location update procedure. For example, the message carries a Tracking Area Update (TAU) Required Indicator or a Routing Area Update (RAU) Required Indicator. Alternatively, the CSG information of the UE is encapsulated into a "Target to Source Transparent Container" information element and carried in the Handover Command message and sent to the access NE.

409. If the access NE receives a Handover Command message, the access NE sends a message (such as Handover Command message) to the UE, instructing the UE to hand over to the target cell.

Optionally, the message may carry location update indication information carried in the Handover Command message received from the mobility management network element or may carry CSG information of the UE.

410. The UE hands over to the target cell, and implements the subsequent procedure.

If the message sent by the access NE in step 409 carries CSG information of the UE, the UE updates the stored allowed CSG list according to the CSG information of the UE.

411. If the location area of the target cell is different from the location area of the cell originally accessed by the UE (namely, the cell accessed before handover), or if the UE receives location area update indication information, the UE triggers a location update procedure, sends a TAU Request message or a RAU Request message to the mobility management network element.

If the mobility management network element is an MME, the message is a TAU Request message; if the mobility management network element is an SGSN, the message is an RAU Request message.

412. If the source mobility management network element is different from the target mobility management network element, the target mobility management network element sends an Update Location message to the HSS.

The target mobility management network element may also send the Update Location message to the background system of the operator.

413. The HSS sends an Update Location Ack message to the target mobility management network element.

If the CSG information is obtained from the background system of the operator, the background system of the operator may also send an Update Location Ack message to the target mobility management network element.

The HSS or the background system of the operator adds the CSG information of the UE into the Update Location Ack message, and sends message to the target mobility management network element.

414. The target mobility management network element returns a TAU Accept message or an RAU Accept message to the UE, with the message carrying the CSG information of the UE.

415. According to the CSG information carried in the TAU Accept message or the RAU Accept message, the UE updates its allowed CSG list, and returns a TAU Complete message or an RAU Complete message to the mobility management network element.

416. If the detaching timer set by the mobility management network element in step 403 expires, or if the mobility management network element receives a Handover Trigger Reject message from the access NE, or if the mobility management network element receives a Handover Request Failure message from the target mobility management network element, the mobility management network element detaches the UE and initiates a detaching procedure by sending a Detach Request message to the UE.

The cause value in the Detach Request message is set to "CSG Access Restricted", or the Detach Request message carries CSG information of the UE.

417. The UE accepts the Detach Request from the mobility management network element, and returns a Detach Accept message to the mobility management network element.

If the cause value in the Detach Request message in step 416 is set to "CSG Access Restricted", the UE deletes the CSG ID of the accessed CSG from the allowed CSG list.

If the Detach Request message in step 416 carries CSG information of the UE, the UE updates the stored allowed CSG list according to the received CSG list information.

It should be noted that if the access NE finds no proper target cell for handover in step 404, the access NE may also instruct the UE to initiate a detaching procedure (for example, by sending a Radio Resource Control (RRC) Release Request message). The message carries indication information which indicates to the UE that the CSG access is restricted, or indicates the need of initiating a detaching procedure due to CSG access restriction, or indicates detaching. For example, the cause value carried in the message is "CSG Access Restricted", or "CSG Access Restricted Detach Required" or "Detach Required". Optionally, the notification message carries CSG information of the UE. After receiving the notification message of the access NE, the UE initiates a detaching procedure by sending a Detach Request message to the mobility management network element. If the notification message carries CSG information of the UE, the UE updates the CSG information stored by the UE according to the received CSG information. The mobility management network element detaches the UE, and returns a Detach Accept message to the UE.

Evidently, after discovering that the UE is not allowed to access the accessed CSG area any longer, the mobility management network element triggers the access NE to initiate a handover procedure which hands over the UE to a target cell. In this way, the UE is detached from the accessed CSG area, and the access control under the CSG mechanism is implemented without interrupting the current service of the UE, thus improving the user experience.

Through a location update procedure or a handover procedure, the CSG information of the UE is sent to the UE so that the UE can know the change of the CSG information and update the stored allowed CSG list according to the modified CSG information. Subsequently, the UE can select only the access NE corresponding to the accessible CSG ID for accessing, thus avoiding invalid access and improving the user experience.

After a detaching timer is set, if the UE fails to move to another non-CSG cell or another CSG cell before timeout of the detaching timer, the UE is detached from the access NE corresponding to the CSG ID of the accessed CSG, and is not allowed to access the accessed access NE any longer, thus accomplishing access control under the CSG mechanism.

Figure 5:
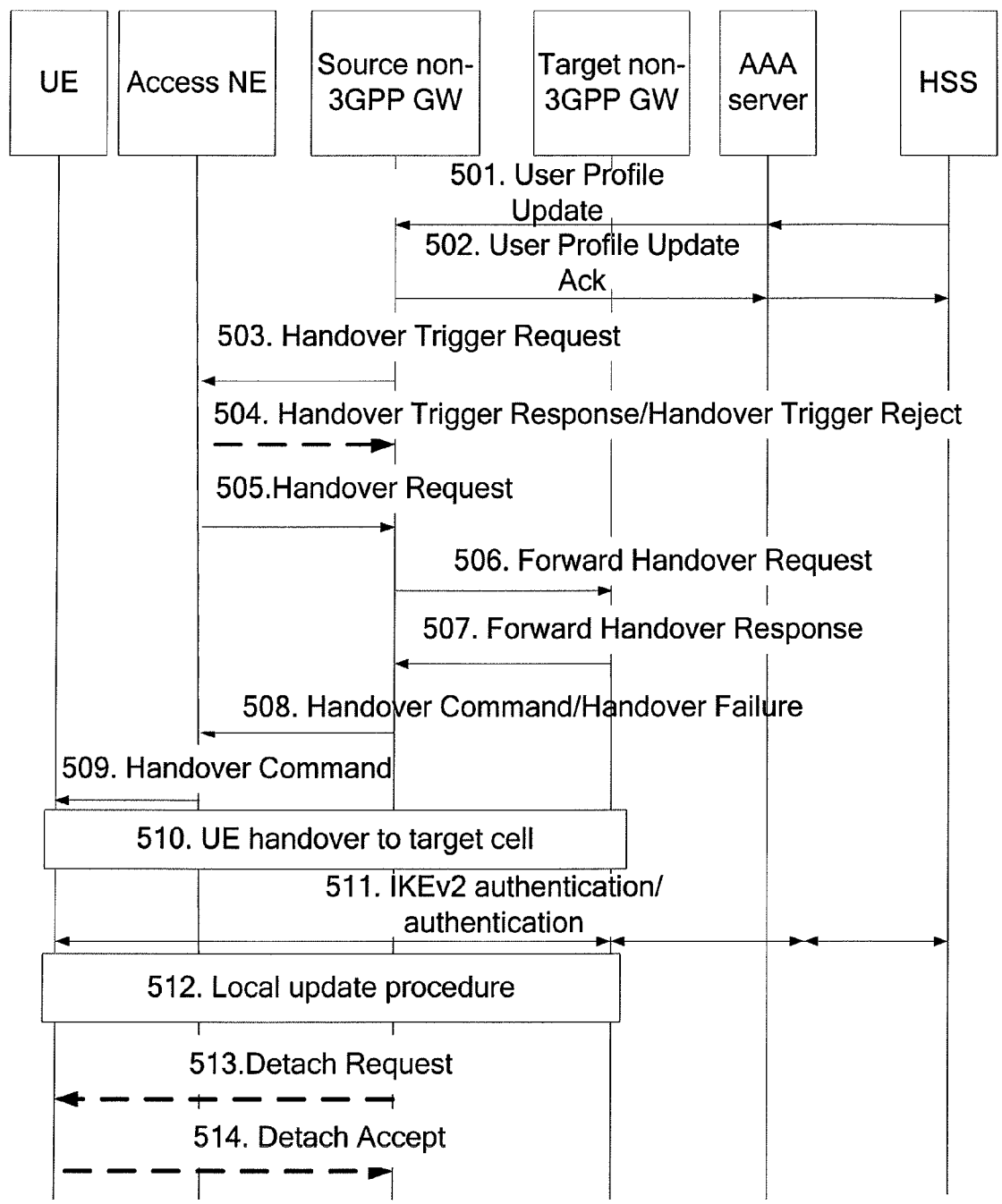
FIG. 5 is a signaling flowchart of a CSG information processing method according to the fourth embodiment.

FIG. 5 is a signaling flowchart of a CSG information processing method in the fourth embodiment. Unlike the previous embodiment, this embodiment is applied to a non-3GPP network. The detailed procedure is as follows:

501. The CSG information of the UE changes, and the HSS or the background system of the operator notifies the CSG information of the UE to the non-3GPP GW.

For example, the HSS sends a User Profile Update message to the AAA server, with the message carrying the CSG information of the UE; and the AAA server sends the User Profile Update message to the non-3GPP GW, with the message carrying the CSG information of the UE. Alternatively, the background system of the operator sends a CSG Notify message to the AAA server, with the message carrying the CSG information of the UE; and the AAA server sends a User Profile Update message to the non-3GPP GW, with the message carrying the CSG information of the UE.

502. The non-3GPP GW returns a Profile Update Ack message to the AAA server. The AAA server returns a User Profile Update Ack message to the HSS or returns a CSG Notify Ack message to the background system of the operator.

503. When the CSG information of the UE changes and the UE is not allowed to access the accessed CSG, the non-3GPP GW sends a Handover Trigger Request message to the access NE, requesting the access NE to move the UE to a non-CSG cell or to a CSG cell corresponding to another CSG ID in the allowed CSG list of the UE.

The non-CSG cell may be a macrocell. The CSG cell corresponding to another CSG ID in the allowed CSG list of the UE is the CSG cell corresponding to a CSG ID of other than the accessed CSG.

Optionally, the Handover Trigger Request message carries the CSG information of the UE. The access NE may be a home non-3GPP WAP, or a non-3GPP WAP capable of CSG functions (namely, access NE in the non-3GPP network capable of CSG functions).

Optionally, the non-3GPP GW starts a timer, which is known as a detaching timer.

504. Optionally, if the access NE finds that no proper target cell is available for handover, the access NE sends a Handover Trigger Reject message to the non-3GPP GW, indicating that the access NE is unable to trigger the handover procedure; if the access NE finds a proper target cell for handover, the access NE sends a Handover Trigger Response message to the non-3GPP GW, indicating that the access NE can trigger a handover procedure, and the procedure proceeds to steps 504-512.

In step 504, if the non-3GPP GW receives a Handover Trigger Response message or a Handover Trigger Failure message sent by the access NE, the non-3GPP GW stops the detaching timer.

505. The access NE selects a target cell, and sends a Handover Required message to the source non-3GPP GW, requesting to move to the target cell.

The source non-3GPP GW is the non-3GPP GW accessed by the UE.

506. The source non-3GPP GW sends a Forward Handover Request message to the target non-3GPP GW.

507. The target non-3GPP GW handles the Forward Handover Request message, and returns a Forward Handover Response message to the source non-3GPP GW. The response message carries a cause value indicating success or failure of the handover request.

It should be noted that if the source non-3GPP GW is the same as the target non-3GPP GW, the interaction in step 506 and step 507 occurs within the same NE.

508. If the target non-3GPP GW in step 507 notifies handover request success to the source non-3GPP GW, the source non-3GPP GW sends a Handover Command message to the access NE. If the target non-3GPP GW in step 509 notifies handover request failure to the source non-3GPP GW, the source non-3GPP GW sends a Handover Failure message to the access NE.

Optionally, the Handover Command message carries location update indication information, instructing the UE to initiate a location update procedure; or, the Handover Command message carries CSG information of the UE.

509. If the access NE receives a Handover Command message, the access NE sends a message (such as Handover Command message) to the UE, instructing the UE to hand over to the target cell.

Optionally, the message carries location update indication information carried in the Handover Command message received from the non-3GPP GW or carries CSG information of the UE.

510. The UE hands over to the target cell, and implements the subsequent procedure.

If the access NE notifies the CSG information of the UE to the UE, the UE updates the allowed CSG list according to the received CSG information.

511. If the UE receives location update indication information, an IKEv2 authentication procedure or another authentication procedure is performed between the UE, the non-3GPP GW, the AAA server, and the HSS.

The non-3GPP GW notifies the CSG information of the UE to the UE in the IKEv2 authentication procedure or other authentication procedure, and the UE updates the allowed CSG list according to the CSG information of the UE.

512. The UE initiates a location update procedure, and implements the location update specific to the non-3GPP network.

513. If the detaching timer in the source non-3GPP GW expires, or if the source non-3GPP GW receives a Handover Trigger Reject message from the access NE, or if the source non-3GPP GW receives a Handover Request Failure message from the target non-3GPP GW, the source non-3GPP GW detaches the UE and initiates a detaching procedure.

The non-3GPP GW sends a Detach Request message to the UE. The cause value in the Detach Request message is set to "CSG Access Restricted", or the Detach Request message carries CSG information of the UE.

514. The UE accepts the Detach Request from the non-3GPP GW, and returns a Detach Accept message to the non-3GPP GW.

If the cause value in the Detach Request message in step 513 is set to "CSG Access Restricted", the UE deletes the accessed CSG ID from the allowed CSG list; if the Detach Request message in step 513 carries the CSG information of the UE, the UE updates its allowed CSG list according to the received CSG list information.

It should be noted that if the access NE finds no proper target cell for handover in step 504, the access NE may also instruct the UE to initiate a detaching procedure (for example, by sending an Release Request message). The message carries indication information which indicates to the UE that the CSG access is restricted, or indicates the need of initiating a detaching procedure due to CSG access restriction, or indicates detaching. For example, the cause value carried in the message is "CSG Access Restricted", or "CSG Access Restricted Detach Required" or "Detach Required". Optionally, the notification message carries CSG information of the UE. After receiving the notification message from the access NE, the UE initiates a Detach procedure and sends a Detach Request message to the mobility management network element. If the notification message carries CSG information of the UE, the UE updates the CSG information stored by the UE according to the received CSG information. The mobility management network element detaches the UE, and returns a Detach Accept message to the UE.

Figure 6:
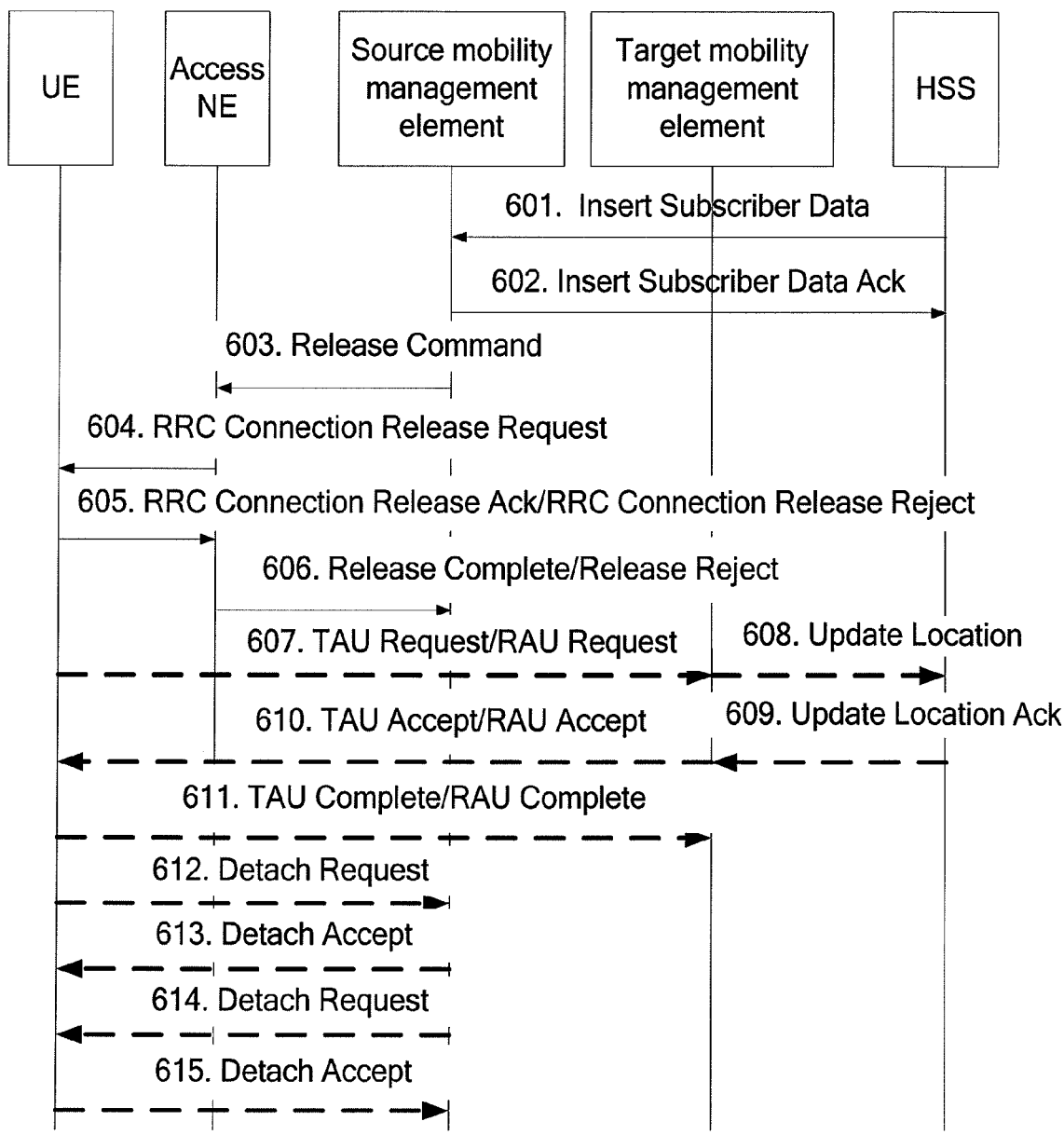
FIG. 6 is a signaling flowchart of a CSG information processing method according to the fifth embodiment.

FIG. 6 is a signaling flowchart of a CSG information processing method in the fifth embodiment. When the CSG information of the UE changes and the UE is not allowed to access the accessed CSG, the source mobility management network element notifies the UE to trigger a location update procedure. After receiving the notification message, the UE selects a target cell, and then triggers a location update procedure. The target mobility management network element notifies the CSG information of the UE to the UE in the location update procedure. The UE updates the stored allowed CSG list according to the CSG information. The detailed steps are as follows:

601. The CSG information of the UE changes, and the HSS sends an Insert Subscriber Data message to the source mobility management network element. The message carries the CSG information of the UE.

Alternatively, the background system (such as OSS or BOSS) of the operator notifies the CSG information of the UE to the mobility management network element. For example, the background system of the operator sends a CSG Notify message to the mobility management network element, with the message carrying the CSG information of the UE.

For a GERAN/UTRAN network, the source mobility management network element is an SGSN; for an E-UTRAN network, the source mobility management network element is an MME.

602. The source mobility management network element returns an Insert Subscriber Data Ack message to the HSS.

If the mobility management network element obtains the CSG information from the background system of the operator, the source mobility management network element returns a CSG Notify Ack message to the background system of the operator.

603. If the CSG information of the UE changes, which makes the UE unable to access the accessed CSG any longer, the source mobility management network element sends a Release Command message to the access NE, requesting the access NE to release resources.

The Release Command message carries an indication, indicating that location update needs to be initiated because the CSG access is restricted. For example, the Release Command message carries a cause value "CSG Access Restricted TAU Required" or "CSG Access Restricted RAU Required". Alternatively, the Release Command message carries an indication, indicating that location update needs to be initiated. For example, the Release Command message carries a cause value "TAU Required" or "RAU Required" and carries CSG information of the UE.

For the E-UTRAN network, the Release Command message is an S1 UE Context Release Command message; for a UTRAN network, the Release Command message is an Iu Release Command message.

Optionally, the source mobility management network element starts a timer, which is known as a detaching timer.

604. The access NE sends an RRC Connection Release Request message to the UE.

The message may carry a "CSG Access Restricted LU Required" indication; or carry a location update indication and CSG information of the UE.

605. The UE returns an RRC Connection Release Ack message to the access NE.

Optionally, if the UE finds that no proper cell is available for triggering the location update procedure, the UE returns an RRC Connection Release Reject message to the access NE.

If the RRC Connection Release Request message carries CSG information of the UE, the UE updates the allowed CSG list according to the received CSG list information. If the RRC Connection Release Request message carries a "CSG Access Restricted" indication, the UE deletes the CSG ID of the accessed CSG from the allowed CSG list.

606. The access NE returns a Release Complete message to the source mobility management network element.

Optionally, if the access NE receives an RRC Connection Release Reject message, the access NE sends a Release Reject message to the source mobility management network element.

607. The UE selects a non-CSG cell or another cell corresponding to the CSG ID in the allowed CSG list of the UE, and then triggers a location update procedure and performs steps 607-611.

The UE sends a TAU Request message or RAU Request message to the target mobility management network element.

If the target mobility management network element is an MME, the message is a TAU Request message; if the target mobility management network element is an SGSN, the message is an RAU Request message.

608. If the source mobility management network element is different from the target mobility management network element, the target mobility management network element sends an Update Location message to the HSS.

The target mobility management network element may also send the Update Location message to the background system of the operator.

609. The HSS sends an Update Location Ack message to the target mobility management network element.

If the CSG information is obtained from the background system of the operator, the background system of the operator may also send an Update Location Ack message to the target mobility management network element.

The Update Location Ack message carries CSG information of the UE.

610. The target mobility management network element returns a TAU Accept message or an RAU Accept message to the UE, with the message carrying the CSG information of the UE.

611. According to the CSG information carried in the TAU Accept message or the RAU Accept message, the UE updates its allowed CSG list, and returns a TAU Complete message or an RAU Complete message to the target mobility management network element.

612. If the UE is unable to select a non-CSG cell or a cell in the allowed CSG list of the UE, the UE initiates a detaching procedure, and step 612 and step 613 are executed. The UE sends a Detach Request message to the source mobility management network element.

613. The source mobility management network element returns a Detach Accept message to the UE.

The Detach Accept message carries an allowed CSG list of the UE, and the UE updates the stored allowed CSG list according to the received CSG list information.

614. If the detaching timer set by the source mobility management network element in step 603 expires, or if the source mobility management network element receives a Release Reject message from the access NE, the source mobility management network element detaches the UE and initiates a detaching procedure by sending a Detach Request message to the UE.

The cause value in the Detach Request message is set to "CSG Access Restricted", or the Detach Request message carries an allowed CSG list of the UE.

615. The UE accepts the Detach Request from the source mobility management network element, and returns a Detach Accept message to the source mobility management network element.

If the cause value in the Detach Request message in step 614 is set to "CSG Access Restricted", the UE deletes the CSG ID of the accessed CSG from the allowed CSG list.

If the Detach Request message in step 614 carries CSG information of the UE, the UE updates the allowed CSG list according to the received CSG information.

Evidently, in this embodiment, after discovering that the UE is not allowed to access the accessed CSG area any longer, the mobility management network element triggers the UE to initiate a location update procedure which moves the UE to a target cell. In this way, the UE is detached from the accessed CSG area, and the access control under the CSG mechanism is implemented without interrupting the current service of the UE, thus improving the user experience.

Through the location update procedure, the CSG information of the UE is sent to the UE so that the UE can know the change of the CSG information and update the stored allowed CSG list according to the modified CSG information. Subsequently, the UE can select only the access NE corresponding to the accessible CSG ID for accessing, thus avoiding invalid access and improving the user experience.

After a detaching timer is set, if the UE fails to move to another non-CSG cell or another CSG cell before timeout of the detaching timer, the UE is detached from the access NE corresponding to the CSG ID of the accessed CSG, and is not allowed to access the accessed access NE any longer, thus accomplishing access control under the CSG mechanism.

Figure 7:
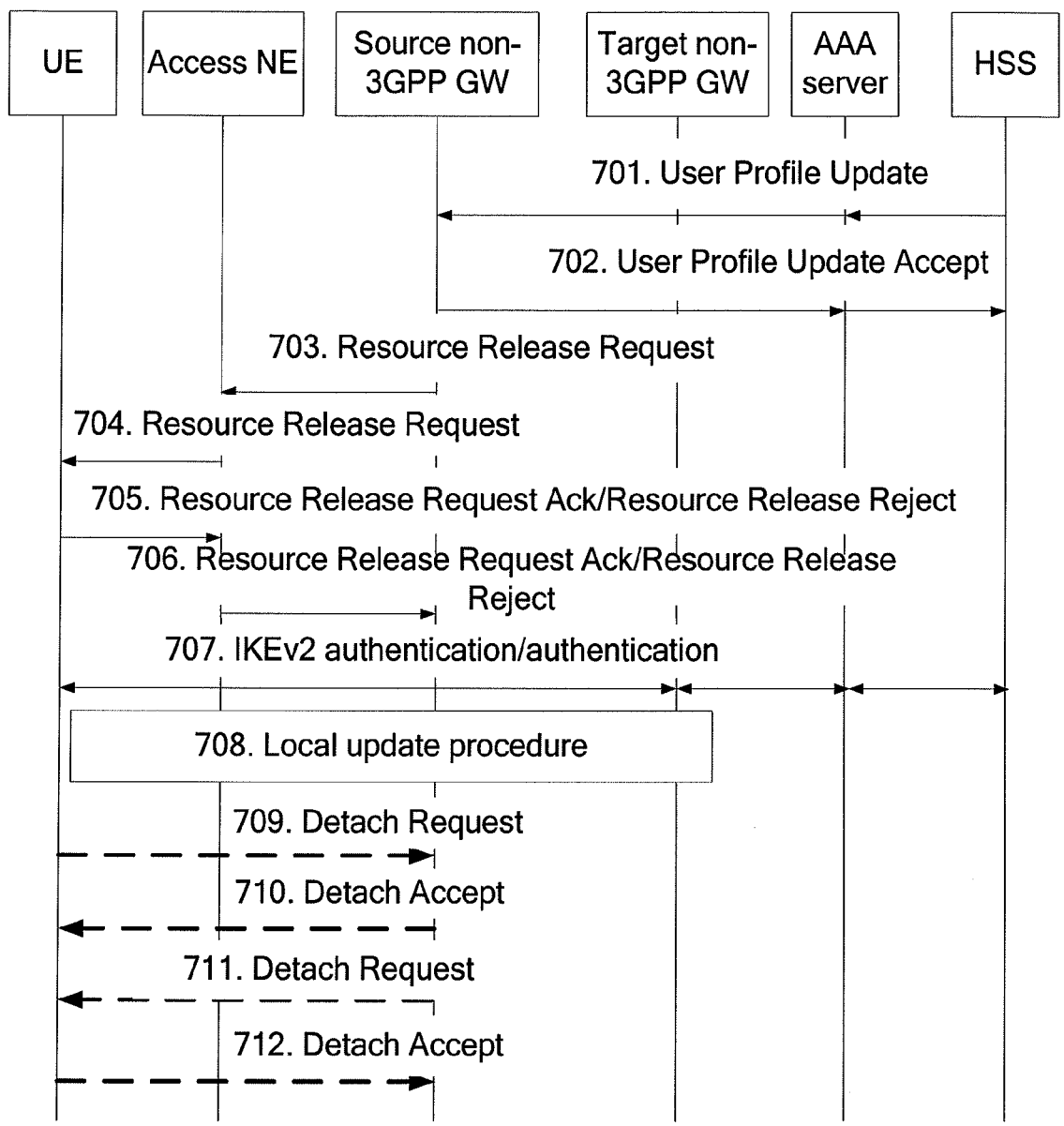
FIG. 7 is a signaling flowchart of a CSG information processing method according to the sixth embodiment.

FIG. 7 is a signaling flowchart of a CSG information processing method in the sixth embodiment. Unlike the previous embodiment, this embodiment is implemented in a non-3GPP network. The detailed procedure is as follows:

701. The CSG information of the UE changes, and the HSS or the background system of the operator notifies the CSG information of the UE to the non-3GPP GW.

For example, the HSS sends a User Profile Update message to the AAA server, with the message carrying the CSG information of the UE; and the AAA server sends the User Profile Update message to the non-3GPP GW, with the message carrying the CSG information of the UE. Alternatively, the background system of the operator sends a CSG Notify message to the AAA server, with the message carrying the CSG information of the UE; and the AAA server sends a User Profile Update message to the non-3GPP GW, with the message carrying the CSG information of the UE.

702. The non-3GPP GW returns a Profile Update Ack message to the AAA server. The AAA server returns a User Profile Update Ack message to the HSS or returns a CSG Notify Ack message to the background system of the operator.

703. If the CSG information of the UE changes, which makes the UE unable to access the accessed CSG any longer, the source non-3GPP GW sends a Resource Release Request message to the access NE, requesting the access NE to release resources.

The Resource Release Request message carries an indication, indicating that location update needs to be initiated because the CSG access is restricted. For example, the Resource Release Request message carries a cause value "CSG Access Restricted LU Required". Alternatively, the Resource Release Request message carries a location update indication (for example, carries a cause value "LU Required") and CSG information of the UE.

Optionally, the source non-3GPP GW starts a timer, which is known as a detaching timer.

704. The access NE sends a Resource Release Request message to the UE.

The message carries a "CSG Access Restricted LU Required"; or carries a location update indication and CSG information of the UE.

705. The UE returns a Resource Release Request Ack message to the access NE.

Optionally, if the UE finds that no proper cell is available for triggering the location update procedure, the UE returns a Resource Release Reject message to the access NE.

706. The access NE returns a Resource Release Request Ack message to the source non-3GPP GW.

Optionally, if the access NE receives a Resource Release Reject message, the access NE sends a Resource Release Reject message to the source non-3GPP GW.

707. The UE selects a non-CSG cell or a cell corresponding to another CSG ID in the allowed CSG list of the UE, and then triggers a location update procedure. Step 707 and step 708 are executed.

An IKEv2 authentication procedure or other authentication procedure is performed between the UE, the source non-3GPP GW, the AAA server, and the HSS. The CSG information of the UE is notified to the UE in the IKEv2 authentication procedure or other authentication procedure, and the UE updates the allowed CSG list according to the CSG information of the UE.

708. The UE initiates a location update procedure, and implements the location update specific to the non-3GPP network.

709. If the UE is unable to select a non-CSG cell or a cell in the allowed CSG list of the UE, the UE initiates a detaching procedure, and step 709 and step 710 are executed. The UE sends a Detach Request message to the source non-3GPP GW.

710. The source non-3GPP GW returns a Detach Accept message to the UE.

The Detach Accept message carries CSG information of the UE, and the UE updates the allowed CSG list according to the received CSG information.

711. If the detaching timer set by the source non-3GPP GW in step 703 expires, or if the source non-3GPP GW receives a Resource Release Reject message from the access NE, the source non-3GPP GW detaches the UE and initiates a detaching procedure by sending a Detach Request message to the UE.

The cause value in the Detach Request message is set to "CSG Access Restricted", or the Detach Request message carries CSG information of the UE.

712. The UE accepts the Detach Request from the source non-3GPP GW, and returns a Detach Accept message to the source non-3GPP GW.

If the cause value in the Detach Request message in step 713 is set to "CSG Access Restricted", the UE deletes the accessed CSG ID from the allowed CSG list; if the Detach Request message in step 713 carries the CSG information of the UE, the UE updates its allowed CSG list according to the received CSG list information.

Figure 8:
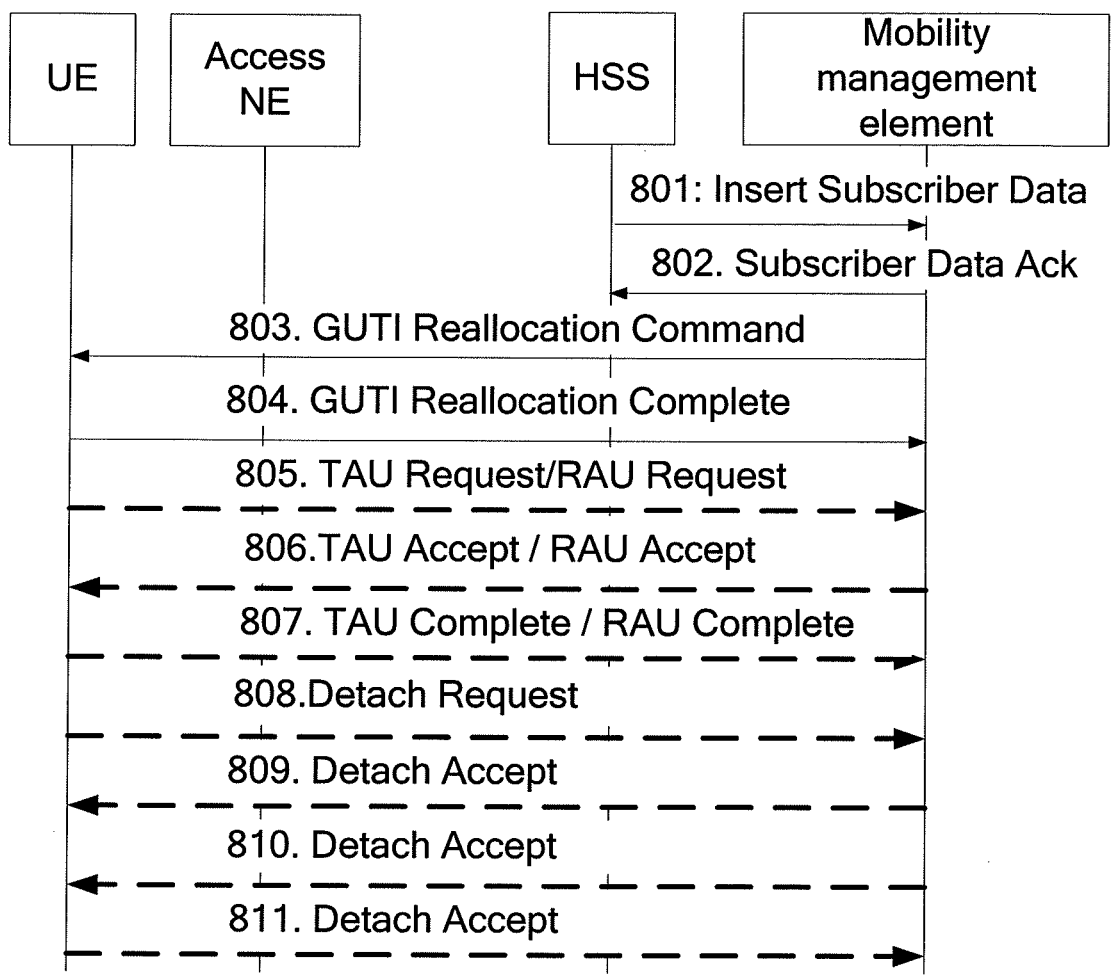
FIG. 8 is a signaling flowchart of a CSG information processing method according to the seventh embodiment.

FIG. 8 is a signaling flowchart of a CSG information processing method in the seventh embodiment. If the CSG information of the UE changes, the mobility management network element sends a specific CSG notification message to the UE. The message carries the CSG information of the UE, and the UE can update the stored allowed CSG list according to the received CSG information. If the accessed CSG area by the UE is no longer accessible, the UE selects a non-CSG cell (such as macrocell) or another accessible CSG cell, and then triggers a location update procedure. If the UE is unable to select a non-CSG cell or other accessible CSG cell, the UE initiates a detaching procedure. The detailed procedure is as follows:

801. The CSG information of the UE changes and the HSS sends an Insert Subscriber Data message to the mobility management network element. The message carries the CSG information of the UE.

Alternatively, the background system (such as OSS or BOSS) of the operator notifies the CSG information of the UE to the mobility management network element. For example, the background system of the HSS operator sends a CSG Notify message to the mobility management network element, with the message carrying the CSG information of the UE.

For a GERAN/UTRAN network, the mobility management network element is SGSN; for an E-UTRAN network, the mobility management network element is MME.

802. The mobility management network element returns an Insert Subscriber Data Ack message to the HSS.

If the background system of the operator sends the notification message, the mobility management network element returns a CSG Notify Ack message to the background system of the operator.

803. If the CSG information of the UE changes, the mobility management network element sends a Globally Unique Temporary Identifier (GUTI) Reallocation Command message to the UE, with the message carrying the CSG information of the UE; or, the mobility management network element sends a specific CSG notification message (such as CSG Reallocation Command) to the UE, with the message carrying the CSG information of the UE.

Optionally, if finding that the UE is not allowed to access the accessed CSG area any longer, the mobility management network element starts a timer, which is known as a detaching timer.

804. The UE accepts the GUTI Reallocation Command or the specific CSG notification message, and returns a GUTI Reallocation Complete message or a CSG Reallocation Complete message to the mobility management network element.

The UE updates the allowed CSG list according to the received CSG information.

805. If finding that the accessed CSG area by the UE is no longer accessible according to the new allowed CSG list, the UE selects a non-CSG cell (such as macrocell) or another accessible CSG cell, triggers a location update procedure, performs steps 805-807, and sends a TAU Request message or an RAU Request message to the mobility management network element.

If the mobility management network element is an MME, the message is a TAU Request message; if the mobility management network element is an SGSN, the message is an RAU Request message.

806. The mobility management network element returns a TAU Accept message or an RAU Accept message to the UE.

If the detaching timer has been started, the mobility management network element stops the detaching timer.

807. The UE returns a TAU Complete message or an RAU Complete message to the mobility management network element.

808. If the UE finds that the accessed CSG area by the UE is no longer accessible according to the new allowed CSG list, and the UE is unable to select a non-CSG cell or another accessible CSG cell, the UE initiates a detaching procedure, performs step 808 and step 809, and sends a Detach Request message to the mobility management network element.

809. The mobility management network element returns a Detach Accept message to the UE.

810. If the detaching timer set by the mobility management network element in step 803 expires, the mobility management network element detaches the UE and initiates a detaching procedure by sending a Detach Request message to the UE.

The cause value in the Detach Request message is set to "CSG Access Restricted", or the Detach Request message carries CSG information of the UE.

811. The UE accepts the Detach Request from the mobility management network element, and returns a Detach Accept message to the mobility management network element.

If the cause value in the Detach Request message in step 810 is set to "CSG Access Restricted", the UE deletes the accessed CSG ID from the allowed CSG list; if the Detach Request message in step 810 carries the CSG information of the UE, the UE updates its allowed CSG list according to the received CSG list information.

It should be noted that in step 805, if the UE finds that the accessed CSG area is no longer accessible according to the new allowed CSG list, the UE may initiate a detaching procedure directly instead of the location update procedure, and step 808 and step 809 are executed. Alternatively, if the UE and the mobility management network element find that the accessed CSG area is no longer accessible according to the new allowed CSG list, both the UE and the MME detach the user locally (namely, the MME or the UE sends no Detach Request message).

Evidently, in this embodiment, when the CSG information of the UE changes, the mobility management network element notifies the changed CSG information to the UE. Subsequently, the UE can select only the access NE corresponding to the accessible CSG ID for accessing, thus avoiding invalid access and improving the user experience.

After discovering that the UE is not allowed to access the accessed CSG area any longer, the UE initiates a location update procedure which moves the UE to a target cell. In this way, the UE is detached from the accessed CSG area, and the access control under the CSG mechanism is implemented without interrupting the current service of the UE, thus improving the user experience. If the UE is unable to trigger the location update procedure to move the UE to a target cell, the UE initiates a detaching procedure, and detaches the UE from the accessed access NE, thus implementing access control under the CSG mechanism.

After a detaching timer is set, if the UE fails to move to another non-CSG cell or another CSG cell before timeout of the detaching timer, the UE is detached from the access NE corresponding to the CSG ID of the accessed CSG, and is not allowed to access the accessed access NE any longer, thus accomplishing access control under the CSG mechanism.

Figure 9:
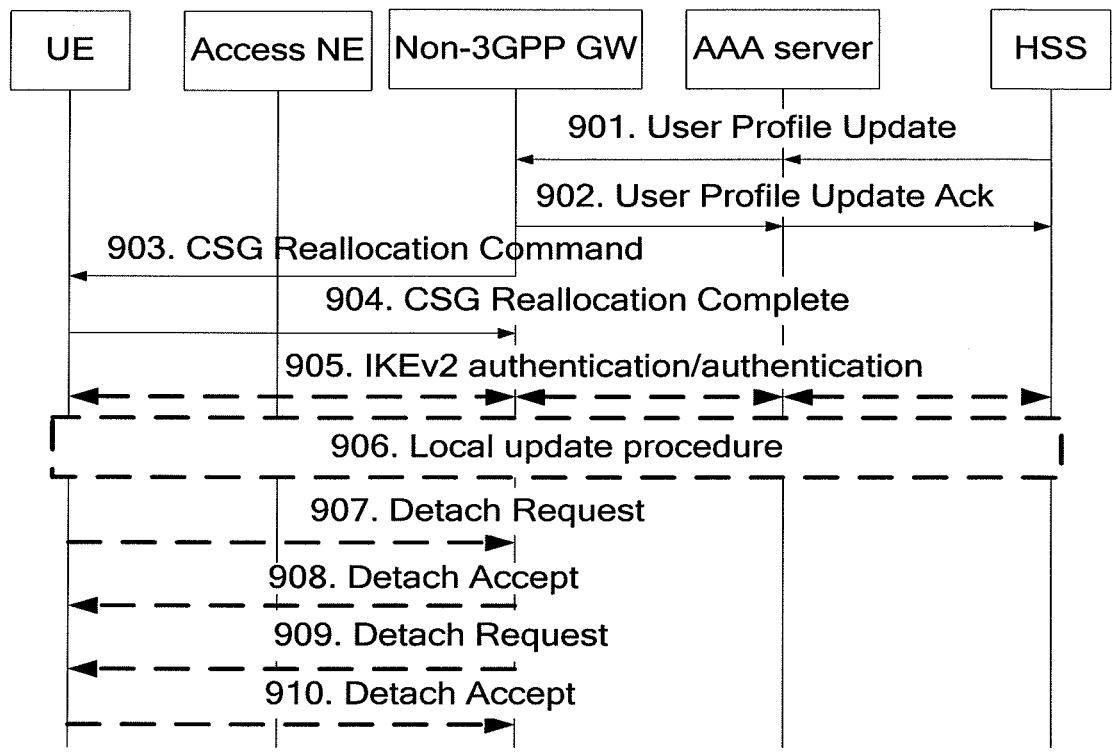
FIG. 9 is a signaling flowchart of a CSG information processing method according to the eighth embodiment.

FIG. 9 is a signaling flowchart of a CSG information processing method in the eighth embodiment. This embodiment differs from the previous embodiment in that the non-3GPP GW sends a CSG Reallocation Command message. The detailed procedure is as follows:

901. The CSG information of the UE changes, and the HSS or the background system of the operator notifies the CSG information of the UE to the non-3GPP GW.

For example, the HSS sends a User Profile Update message to the AAA server, with the message carrying the CSG information of the UE; and the AAA server sends the User Profile Update message to the non-3GPP GW, with the message carrying the CSG information of the UE. Alternatively, the background system of the operator sends a CSG Notify message to the AAA server, with the message carrying the CSG information of the UE; and the AAA server sends a User Profile Update message to the non-3GPP GW, with the message carrying the CSG information of the UE.

902. The non-3GPP GW returns a Profile Update Ack message to the AAA server. The AAA server returns a User Profile Update Ack message to the HSS or returns a CSG Notify Ack message to the background system of the operator.

903. If the CSG information of the UE changes, the non-3GPP GW sends a CSG Reallocation Command message to the UE. The message carries CSG information of the UE.

Optionally, if finding that the UE is not allowed to access the accessed CSG area any longer, the non-3GPP GW starts a timer, which is known as a detaching timer.

904. The UE accepts the CSG Reallocation Command from the non-3GPP GW, and returns a CSG Reallocation Complete message to the non-3GPP GW.

The UE updates the allowed CSG list according to the received CSG information.

905. If finding that the accessed CSG area by the UE is no longer accessible according to the new allowed CSG list, the UE selects a non-CSG cell (such as macrocell) or another accessible CSG cell, triggers a location update procedure, and performs step 905 and step 906.

An IKEv2 authentication procedure or another authentication procedure is performed between the UE, the non-3GPP GW, the AAA server, and the HSS.

906. The UE initiates a location update procedure, and implements the location update specific to the non-3GPP network.

If the detaching timer has been started, the mobility management network element stops the detaching timer.

907. If the UE finds that the accessed CSG area by the UE is no longer accessible according to the new allowed CSG list, and the UE is unable to select a non-CSG cell or another accessible CSG cell, the UE initiates a detaching procedure, performs step 907 and step 908, and sends a Detach Request message to the non-3GPP GW.

908. The non-3GPP GW returns a Detach Accept message to the UE.

909. If the detaching timer set by the non-3GPP GW in step 903 expires, the non-3GPP GW detaches the UE and initiates a detaching procedure by sending a Detach Request message to the UE.

The cause value in the Detach Request message is set to "CSG Access Restricted", or the Detach Request message carries CSG information of the UE.

910. The UE accepts the Detach Request from the non-3GPP GW, and returns a Detach Accept message to the non-3GPP If the cause value in the Detach Request message in step 909 is set to "CSG Access Restricted", the UE deletes the accessed CSG ID from the allowed CSG list; if the Detach Request message in step 909 carries the CSG information of the UE, the UE updates its allowed CSG list according to the received CSG list information.

It should be noted that in step 905, if the UE finds that the accessed CSG area is no longer accessible according to the new allowed CSG list, the UE may initiate a detaching procedure directly instead of the location update procedure, and step 907 and step 908 are executed. Alternatively, if the UE and the non-3GPP GW find that the accessed CSG area is no longer accessible according to the new allowed CSG list, both the UE and the MME detach the user locally (namely, the MME or the UE sends no Detach Request message).

Figure 10:
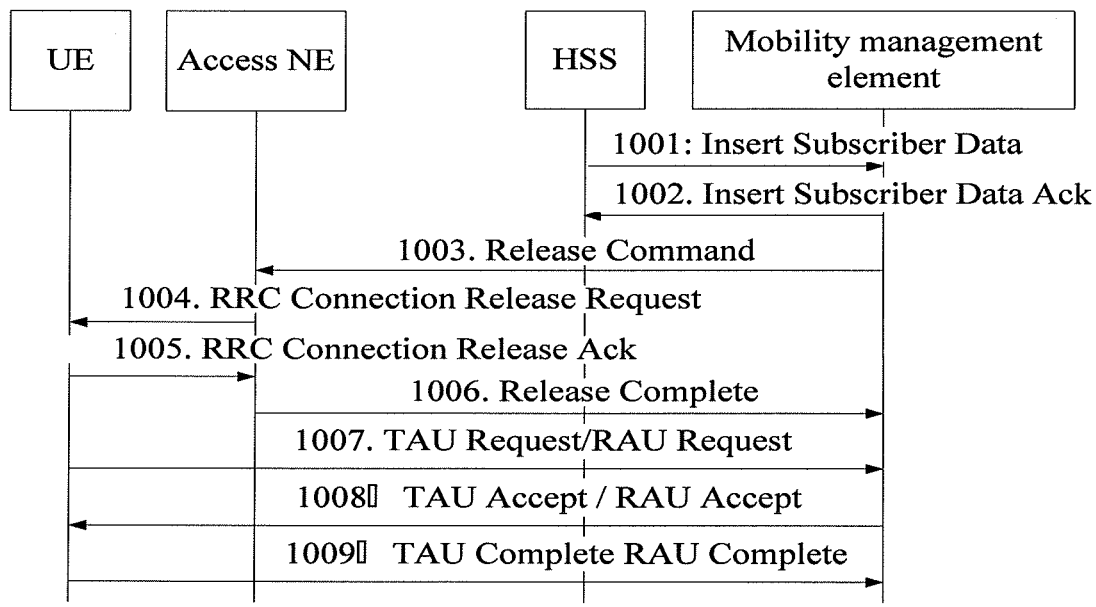
FIG. 10 is a signaling flowchart of a CSG information processing method according to the ninth embodiment.

FIG. 10 is a signaling flowchart of a CSG information processing method in the ninth embodiment. When the CSG information of the UE changes and the UE is allowed to access the accessed CSG area, the mobility management network element notifies the UE to trigger a location update procedure. After receiving the notification message, the UE triggers a location update procedure. The mobility management network element notifies the CSG information of the UE to the UE in the location update procedure. The UE updates the stored allowed CSG list according to the received CSG information. The detailed steps are as follows:

1001. The CSG information of the UE changes, and the HSS sends an Insert Subscriber Data message to the mobility management network element. The message carries the CSG information of the UE.

Alternatively, the background system (such as OSS or BOSS) of the operator notifies the CSG information of the UE to the mobility management network element. For example, the background system of the operator sends a CSG Notify message to the mobility management network element, with the message carrying the CSG information of the UE.

For a GERAN/UTRAN network, the mobility management network element is SGSN; for an E-UTRAN network, the mobility management network element is MME.

1002. The mobility management network element returns an Insert Subscriber Data Ack message to the HSS.

If the CSG notification message is received from the background system of the operator, the mobility management network element returns a CSG Notify Ack message to the background system of the operator.

1003. If the CSG information of the UE changes and the UE is allowed to access the accessed CSG, the mobility management network element sends a Release Command message to the access NE, requesting the access NE to release resources. The Release Command message carries a location update indication, for example, carries a cause value "TAU Required" or "RAU Required".

For the E-UTRAN network, the Release Command message is an S1 UE Context Release Command message; for a UTRAN network, the Release Command message is an Iu Release Command message.

1004. The access NE sends an RRC Connection Release Request message to the UE, with the message carrying a location update indication.

1005. The UE returns an RRC Connection Release Ack message to the access NE.

1006. The access NE returns a Release Complete message to the mobility management network element.

1007. The UE triggers a location update procedure according to the indication information in the RRC Connection Release Request message, and sends a TAU Request message or an RAU Request message to the mobility management network element.

If the mobility management network element is an MME, the message is a TAU Request message; if the mobility management network element is an SGSN, the message is an RAU Request message.

1008. The mobility management network element returns a TAU Accept message or an RAU Accept message to the UE, with the message carrying the CSG information of the UE.

1009. According to the CSG information carried in the TAU Accept message or the RAU Accept message, the UE updates its allowed CSG list, and returns a TAU Complete message or an RAU Complete message to the mobility management network element.

Evidently, in this embodiment, when the CSG information of the UE changes, the mobility management network element notifies the changed CSG information to the UE. Subsequently, the UE can select only the access NE corresponding to the accessible CSG ID for accessing, thus avoiding invalid access and improving the user experience.

Figure 11:
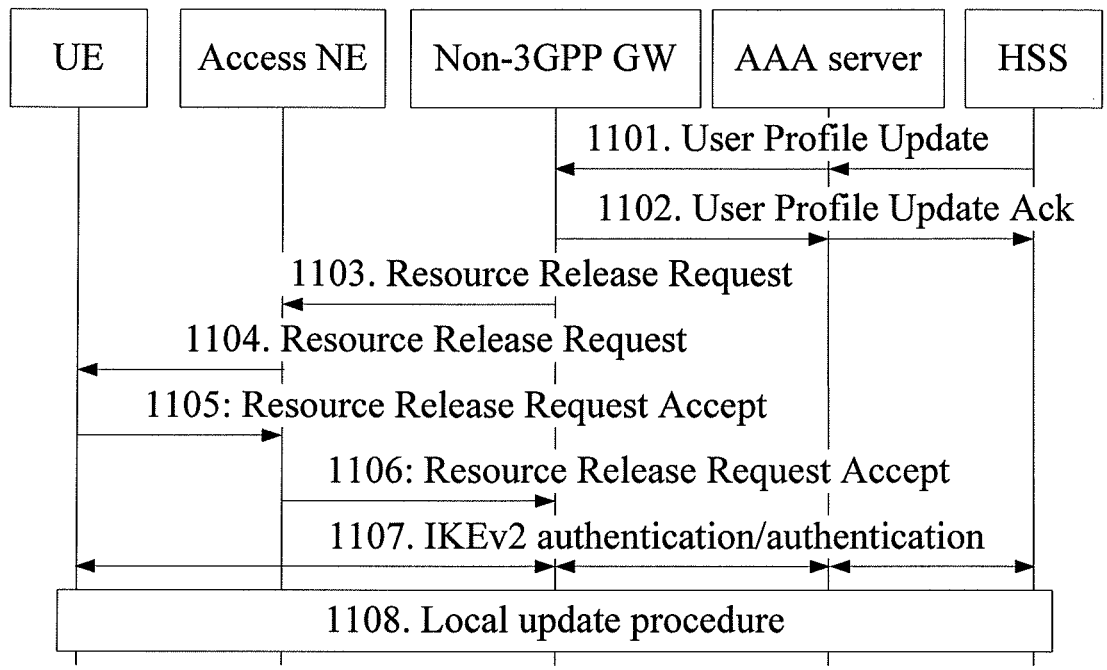
FIG. 11 is a signaling flowchart of a CSG information processing method according to the 10th embodiment.

FIG. 11 is a signaling flowchart of a CSG information processing method in the 10th embodiment. This embodiment differs from the previous embodiment in that the non-3GPP GW notifies the UE to trigger a location update procedure. The detailed steps are as follows:

1101. The CSG information of the UE changes, and the HSS or the background system of the operator notifies the CSG information of the UE to the non-3GPP GW.

For example, the HSS sends a User Profile Update message to the AAA server, with the message carrying the CSG information of the UE; and the AAA server sends the User Profile Update message to the non-3GPP GW, with the message carrying the CSG information of the UE. Alternatively, the background system of the operator sends a CSG Notify message to the AAA server, with the message carrying the CSG information of the UE; and the AAA server sends a User Profile Update message to the non-3GPP GW, with the message carrying the CSG information of the UE.

1102. The non-3GPP GW returns a Profile Update Ack message to the AAA server. The AAA server returns a User Profile Update Ack message to the HSS or returns a CSG Notify Ack message to the background system of the operator.

1103. If the CSG information of the UE changes and the UE is allowed to access the accessed CSG, the non-3GPP GW sends a Resource Release Request message to the access NE, requesting the access NE to release resources.

The Resource Release Request message carries a location update indication, for example, carries a cause value "LU Required".

1104. The access NE sends a Resource Release Request message to the UE, with the message carrying a location update indication.

1105. The UE returns a Resource Release Request Ack message to the access NE.

1106. The access NE returns a Resource Release Request Ack message to the non-3GPP GW.

1107. The UE triggers a location update procedure according to the indication information in the Resource Release Request message.

An IKEv2 authentication procedure or other authentication procedure is performed between the UE, the non-3GPP GW, the AAA server, and the HSS. The non-3GPP GW notifies the CSG information of the UE to the UE in the authentication procedure, and the UE updates the allowed CSG list according to the CSG information of the UE.

1108. The UE initiates a location update procedure, and implements the location update specific to the non-3GPP network.

Evidently, in the foregoing embodiment, the mobility management network element or the non-3GPP GW obtains the modified CSG information, and sends a message to the UE according to the CSG information. The message carries the CSG information. Therefore, when the CSG information changes, the UE knows the change in time.

Figure 12:
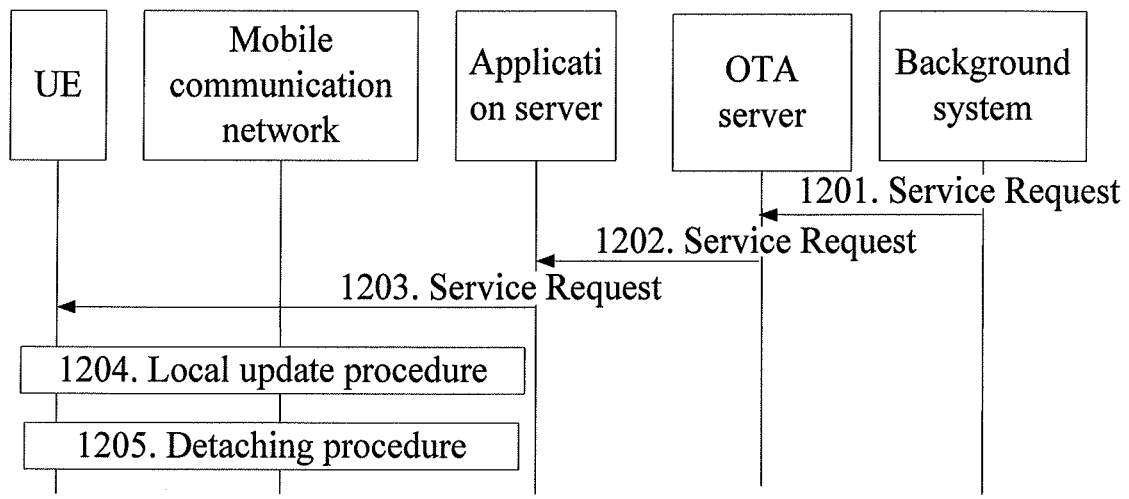
FIG. 12 is a signaling flowchart of a CSG information processing method according to the 11th embodiment.

In the foregoing embodiment, the CSG information of the UE is sent to the UE through the mobility management network element or the non-3GPP GW. It should be noted that the UE can also obtain the CSG information by other means. Another CSG information processing method is disclosed herein. This CSG information processing method is independent of the specific access network, and is detailed in the following embodiment:

FIG. 12 is a signaling flowchart of a CSG information processing method in the 11th embodiment. Unlike in the previous embodiment, the background system (such as OSS or BOSS or HSS) of the operator in this embodiment obtains the CSG information of the UE, and then sends a service request message to the Over The Air (OTA) server. The service request message carries the CSG information of the UE, and the OTA server sends the CSG information of the UE to the UE through an application server so that the UE can obtain the CSG information of the UE and update the stored allowed CSG list. Besides, if the CSG area accessed by the UE is no longer accessible, the UE selects a non-CSG cell (such as macrocell) or another accessible CSG cell, and then triggers a location update procedure. If the UE is unable to select a non-CSG cell or other accessible CSG cell, the UE initiates a detaching procedure. The detailed procedure is as follows:

1201. The background system of the operator obtains the CSG information of the UE (such as the allowed CSG list of the UE), and then sends the CSG information of the UE to the OTA server.

The background system of the operator may be the OSS, BOSS, or HSS of the operator.

1202. The OTA server converts the CSG information of the UE into the format acceptable to the application server, and sends it to the application server.

If the application server is a Short Message Service Center (SMSC), the message is a short message; if the application server is a WAP server, the message is a WAP message; if the application server is an Open Mobile Alliance (OMA) server, the message is an OMA message; if the application server is a Multimedia Messaging Service Center (MMSC), the message is an MMS message.

The background system of the operator may notify the CSG information of the UE to the application server directly, without the CSG information being processed by the OTA server.

1203. The application server sends a service message to the UE through a mobile communication network, and the service message carries an allowed CSG list of the UE.

The service message may be a short message, or a WAP message, or an OMA message, or an MMS message. After receiving the service message, the UE obtains the CSG information of the UE from the service message, and updates the allowed CSG list according to the received CSG information.

1204. If finding that the CSG area accessed by the UE is no longer accessible according to the new allowed CSG list, the UE selects a non-CSG cell (such as macrocell) or another accessible CSG cell, and triggers a location update procedure to move to the selected target cell.

1205. If the UE finds that the CSG area accessed by the UE is no longer accessible according to the new allowed CSG list, and the UE is unable to select a non-CSG cell or another accessible CSG cell, the UE initiates a detaching procedure to detach the UE from the mobile communication network.

It should be noted that in step 1204, if the UE finds that the accessed CSG area is no longer accessible according to the new allowed CSG list, the UE may initiate a detaching procedure to detach the UE from the mobile communication network, but not initiate a location update procedure or detach the user locally.

Elaborated above is a CSG information processing method. The following describes the corresponding system and NE devices.

Figure 13:
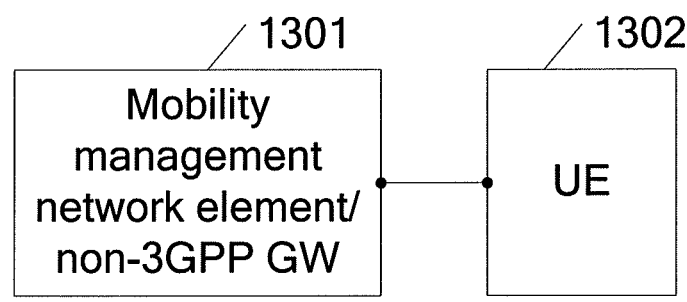
FIG. 13 shows a structure of a network system according to the first embodiment.

FIG. 13 shows a structure of a network system in the first embodiment. The network system includes: a mobility management network element or non-3GPP AGW 1301, and a UE 1302.

The mobility management network element or non-3GPP AGW 1301 is adapted to obtain modified CSG information, and send a message to the UE 1302 according to the modified CSG information, where the message carries the CSG information.

The UE 1302 is adapted to receive the message that carries the CSG information.

Specifically, the mobility management network element or non-3GPP GW may obtain the modified CSG information from the HSS or the background system of the operator.

Specifically, the CSG information may be a "CSG Access Restricted" indication, and the UE 1302 is further adapted to delete the CSG ID of the accessed CSG from the allowed CSG list according to the "CSG Access Restricted" indication.

Alternatively, the CSG information may be modified CSG information, and the UE 1302 is further adapted to update the stored allowed CSG list according to the modified CSG information.

The UE 1302 is further adapted to select a target cell and initiate a location update procedure or an attaching procedure to move to another area when the accessed CSG cell is no longer accessible.

The mobility management network element or non-3GPP GW 1301 is further adapted to send the modified CSG information to the UE 1302. The UE 1302 is further adapted to update the stored allowed CSG list according to the modified CSG information.

The non-3GPP GW 1301 is further adapted to send the modified CSG information to the UE 1302 in an IKEv2 authentication procedure or another authentication procedure. The UE 1301 is further adapted to update the stored allowed CSG list according to the modified CSG information.

Besides, the mobility management network element or non-3GPP GW 1301 is further adapted to send a Detach Request message to the UE 1302 upon timeout of a set detaching timer, with the message carrying the modified CSG information; and the UE 1302 is further adapted to update the stored allowed CSG list according to the modified CSG information.

Figure 14:
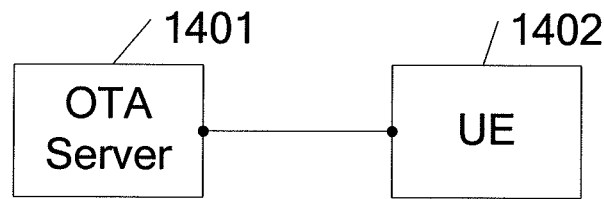
FIG. 14 shows a structure of a network system according to the second embodiment.

FIG. 14 shows a structure of a network system in the second embodiment. The network system includes:

an application server 1401, adapted to obtain CSG information of UE, and send a message that carries the CSG information of the UE to the UE 1402; and a UE 1402, adapted to receive the message that carries the CSG information.

The UE 1402 is further adapted to update the stored allowed CSG list according to the CSG information.

In practice, the UE 1402 is further adapted to check whether the accessed CSG area is accessible, and, if not, select a target cell and initiate a location update procedure to move to other areas.

In practice, the UE 1402 is further adapted to check whether the accessed CSG area is accessible, and, if not, initiate a detaching procedure to detach the UE from the current mobile communication network if the UE 1402 is unable to select a target cell.

Figure 15:
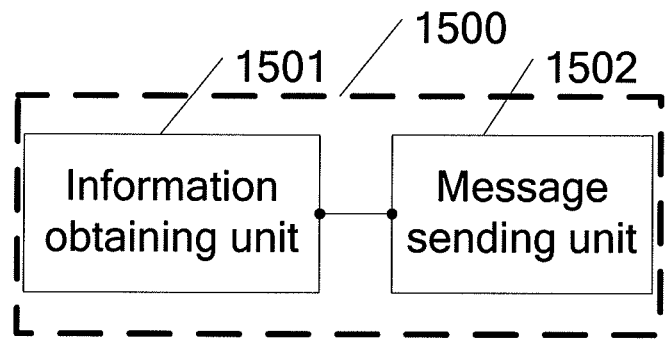
FIG. 15 shows a structure of an NE device according to the first embodiment.

FIG. 15 shows a structure of an NE device in the first embodiment. In practice, the NE device may be a mobility management network element or a non-3GPP GW. For example, the NE device 1500 includes:

an information obtaining unit 1501, adapted to obtain modified CSG information; and a message sending unit 1502, adapted to send a message to UE according to the modified CSG information, where the message carries the CSG information.

The information obtaining unit obtains the modified CSG information of the UE from the HSS or an operation system (such as OSS or BOSS) of the operator.

The CSG information may be a "CSG Access Restricted" indication, or a "CSG Access Restricted LU Required" indication, or a location update indication, or modified CSG information.

Figure 16:
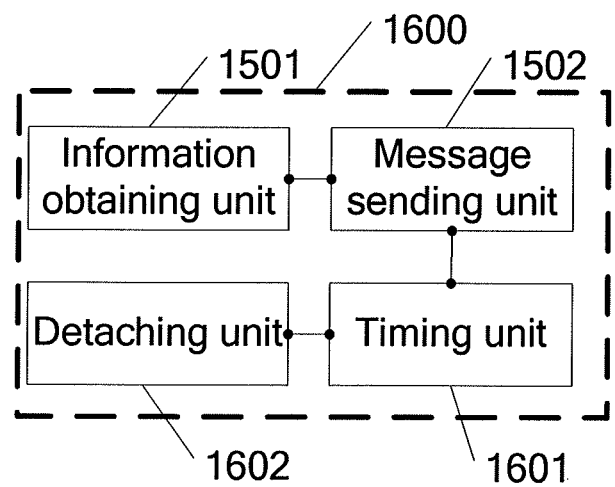
FIG. 16 shows a structure of an NE device according to the second embodiment.

FIG. 16 shows a structure of an NE device in the second embodiment. On the basis of the foregoing embodiment, the NE device 1600 may further include:

a timing unit 1601, adapted to count time; and a detaching unit 1602, adapted to initiate a detaching procedure to detach the UE from the accessed CSG cell when the time counted by the timing unit exceeds a preset value.

Figure 17:
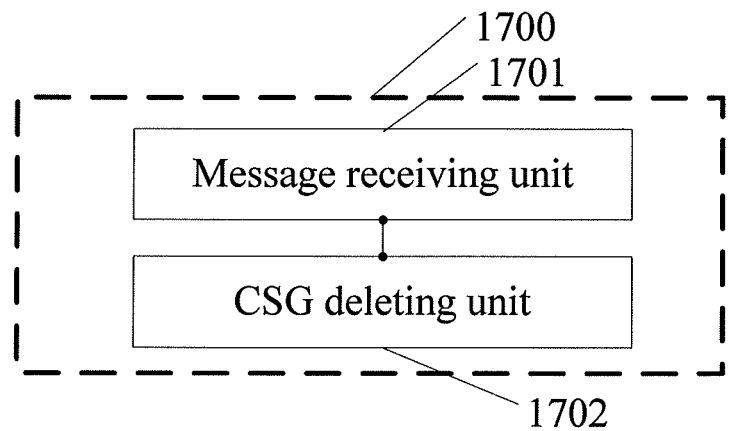
FIG. 17 shows a structure of a UE according to the first embodiment.

FIG. 17 shows a structure of a UE in the first embodiment. A UE 1700 includes:

a message receiving unit 1701, adapted to receive a message that carries CSG information, where the CSG information is a "CSG Access Restricted" indication or a "CSG Access Restricted LU Required" indication; and a CSG deleting unit 1702, adapted to delete an CSG ID of an accessed CSG from an allowed CSG list according to the "CSG Access Restricted" indication or the "CSG Access Restricted LU Required" indication.

Figure 18:
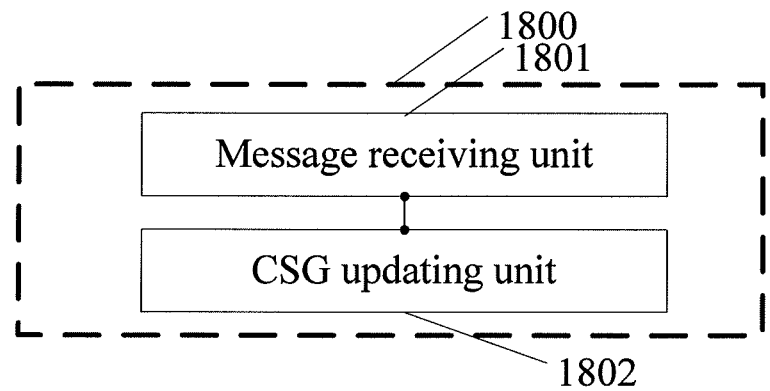
FIG. 18 shows a structure of a UE according to the second embodiment.

FIG. 18 shows a structure of a UE in the second embodiment. The UE 1800 includes:

a message receiving unit 1801, adapted to receive a message that carries CSG information which is modified CSG information; and a CSG updating unit 1802, adapted to update a stored allowed CSG list according to the modified CSG information.

Figure 19:
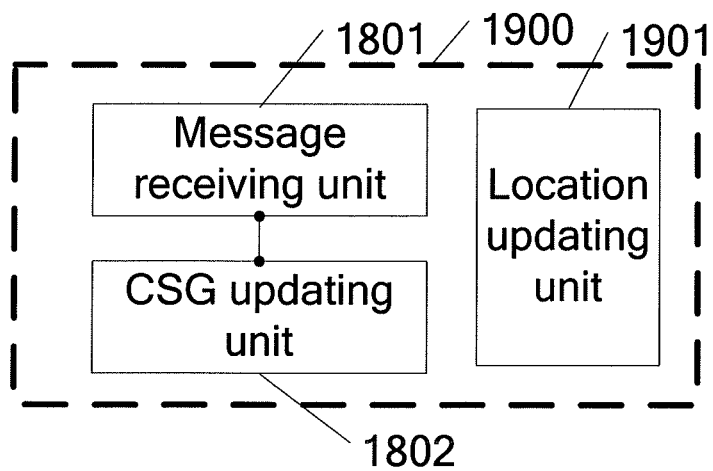
FIG. 19 shows a structure of a UE according to the third embodiment.

FIG. 19 shows a structure of a UE in the third embodiment. On the basis of the second or third embodiment of the UE, the UE may further include an updating unit. For example, on the basis of the third embodiment, the UE 1900 may further include: a location updating unit 1901, adapted to select a target cell and initiate a location update procedure to move to another area when the accessed CSG area is no longer accessible.

In practice, the UE may further include a detaching unit, which is adapted to initiate a detaching procedure and detach from the accessed CSG area.

Figure 20:
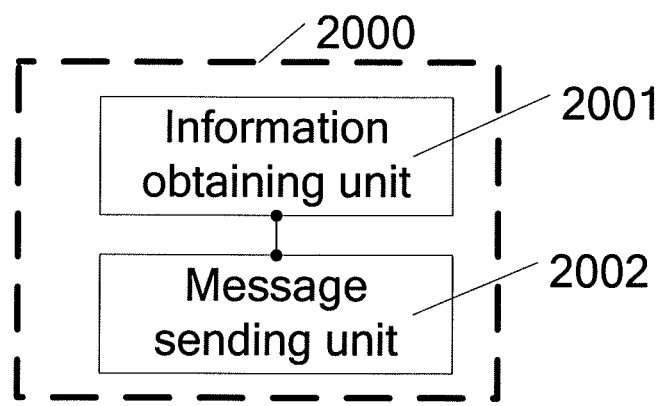
FIG. 20 shows a structure of an NE device according to the third embodiment.

FIG. 20 shows a structure of an NE device in the third embodiment. The NE device 2000 includes:

an information obtaining unit 2001, adapted to obtain modified CSG information from the background system of the operator; and a message sending unit 2002, adapted to send a message to UE through an application server, where the message carries the CSG information of the UE.

Figure 21:
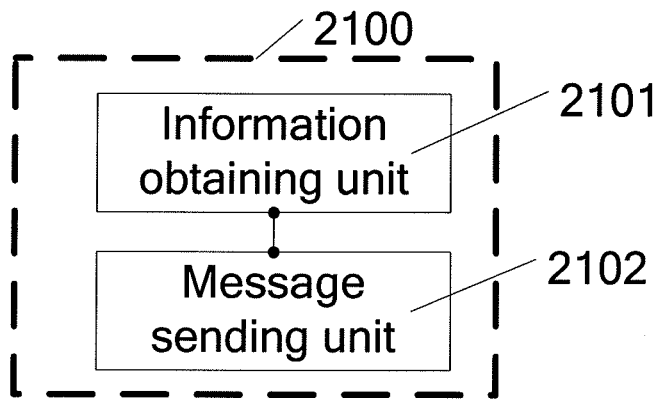
FIG. 21 shows a structure of an NE device according to the fourth embodiment.

FIG. 21 shows a structure of an NE device in the fourth embodiment. The NE device 2100 includes:

an information obtaining unit 2101, adapted to obtain modified CSG information; and a detaching unit 2102, adapted to detach a UE from an accessed CSG area when discovering that the UE is not allowed to access the accessed CSG area any longer according to the modified CSG information.

Persons of ordinary skill in the art should understand that all or a part of the steps of the method in the embodiments may be implemented by a program instructing relevant hardware. The program may be stored in a computer readable storage medium. The storage medium may be a Read-Only Memory (ROM), Random Access Memory (RAM), magnetic disk, or CD-ROM.

Elaborated above are a CSG information processing method, an access control method, and the corresponding system and devices.

What is claimed is:

1. An access control method for closed subscriber group (CSG), comprising:

receiving, by a mobility management entity (MME), an insert subscriber data message from a home subscriber server (HSS), wherein the insert subscriber data message comprises CSG information of a user equipment (UE);

determining, by the MME, that the CSG information of the UE has changed and the UE is not allowed to access an accessed CSG cell;

instructing, by the MME, an access network element to initiate a UE handover from the accessed CSG cell to a target cell; and instructing, by the MME, the access network element to release resources when the UE cannot handover to the target cell within a configured time period.

2. The access control method according to claim 1, wherein the instructing, by the MME, the access network element to release the resources, further comprises:

instructing, by the MME, the access network element to send a radio resource control release request message to the UE.

3. The access control method according to claim 1, wherein the instructing, by the MME, the access network element to release the resources, further comprises:

sending, by the MME, an S1 UE context release command message to the access network element.

4. The access control method according to claim 1, further comprising:

sending, by the MME, an insert subscriber data Acknowledge (Ack) message to the HSS.

5. The access control method according to claim 1, wherein the target cell is a cell of a macro network.

6. The access control method according to claim 1, wherein the access network element is an eNodeB.

7. A mobility management entity (MME), comprising a processor and a non-transitory computer readable storage medium having processor-executable instructions stored thereon, wherein the processor-executable instructions cause the processor to:

receive, by the MME, an insert subscriber data message from a home subscriber server (HSS), wherein the insert subscriber data message comprises CSG information of a user equipment (UE);

determine, by the MME, that the CSG information of the UE has changed and the UE is not allowed to access an accessed CSG cell;

instruct, by the MME, an access network element to initiate a UE handover from the accessed CSG cell to a target cell; and instruct, by the MME, the access network element to release resources when the UE cannot handover to the target cell within a configured time period.

8. The mobility management entity according to claim 7, wherein the processor-executable instructions cause the processor to instruct, by the MME, the access network element to release the resources, further cause the processor to:

instruct, by the MME, the access network element to send a radio resource control release request message to the UE.

9. The mobility management entity according to claim 7, wherein the processor-executable instructions cause the processor to instruct, by the MME, the access network element to release the resources, further cause the processor to:

send, by the MME, an S1 UE context release command message to the access network element.

10. The mobility management entity according to claim 7, wherein the processor-executable instructions further cause the processor to:

send, by the MME, an insert subscriber data Acknowledge (Ack) message to the HSS.

* * * * *